(12) United States Patent
Konaka et al.

(10) Patent No.: US 10,407,019 B2
(45) Date of Patent: Sep. 10, 2019

(54) HEAD-PROTECTING AIRBAG DEVICE

(71) Applicant: TOYODA GOSEI CO., LTD.

(72) Inventors: Hirotake Konaka, Inazawa (JP);
Ryosuke Jinnai, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 16/124,296

(22) Filed: Sep. 7, 2018

(65) Prior Publication Data

US 2019/0009744 A1 Jan. 10, 2019

Related U.S. Application Data

(62) Division of application No. 15/431,846, filed on Feb. 14, 2017, now Pat. No. 10,106,120.

(30) Foreign Application Priority Data

Feb. 26, 2016 (JP) .................................. 2016-36274
Jul. 15, 2016 (JP) ................................. 2016-140584

(51) Int. Cl.
*B60R 21/232* (2011.01)
*B60R 21/213* (2011.01)
*B60R 21/217* (2011.01)
*B60R 21/201* (2011.01)

(52) U.S. Cl.
CPC .......... *B60R 21/232* (2013.01); *B60R 21/213* (2013.01); *B60R 21/2171* (2013.01); *B60R 21/201* (2013.01)

(58) Field of Classification Search
CPC . B60R 21/232; B60R 21/213; B60R 21/2171; B60R 21/201
See application file for complete search history.

(56) References Cited

U.S. PATENT DOCUMENTS

| | | | |
|---|---|---|---|
| 7,699,340 B2 * | 4/2010 | Okuhara | B60R 21/2171 280/728.2 |
| 7,862,075 B2 | 1/2011 | Minamikawa | |
| 7,862,078 B2 * | 1/2011 | Yokota | B60R 21/2171 280/728.2 |

(Continued)

FOREIGN PATENT DOCUMENTS

| | | | | |
|---|---|---|---|---|
| JP | 2015-030367 A | | 2/2015 | |
| JP | 2016190566 A | * | 11/2016 | ....... B60R 21/23138 |

*Primary Examiner* — Nicole T Verley
(74) *Attorney, Agent, or Firm* — Posz Law Group, PLC

(57) ABSTRACT

A head-protecting airbag device includes a case which houses an airbag in a folded-up configuration and a mounting bracket which is used to mount an inflator on a vehicle body structure. The case is mounted on a region of the airbag extending from one end of the inflator. The mounting bracket includes an insert region which fits in an assembling opening of the case. The assembling opening includes a receiving region which receives the insert region along an axial direction of the inflator and a limiting plane that is located in a periphery of the receiving region and holds the insert region from rotating in both directions in a circumferential direction of the inflator. The fitting of the insert region and assembling opening suppresses the airbag stored in the case in the folded-up configuration from rotating in a circumferential direction.

7 Claims, 25 Drawing Sheets

(56) References Cited

U.S. PATENT DOCUMENTS

| | | | |
|---|---|---|---|
| 8,007,000 B2* | 8/2011 | Gammill | B60R 21/232 |
| | | | 280/730.2 |
| 8,500,155 B2* | 8/2013 | Enders | B60R 21/205 |
| | | | 280/728.2 |
| 8,801,031 B1 | 8/2014 | Zucal | |
| 9,573,550 B1* | 2/2017 | Mitchell | B60R 21/213 |
| 2010/0219620 A1 | 9/2010 | Jaramillo | |

* cited by examiner

Fig. 16
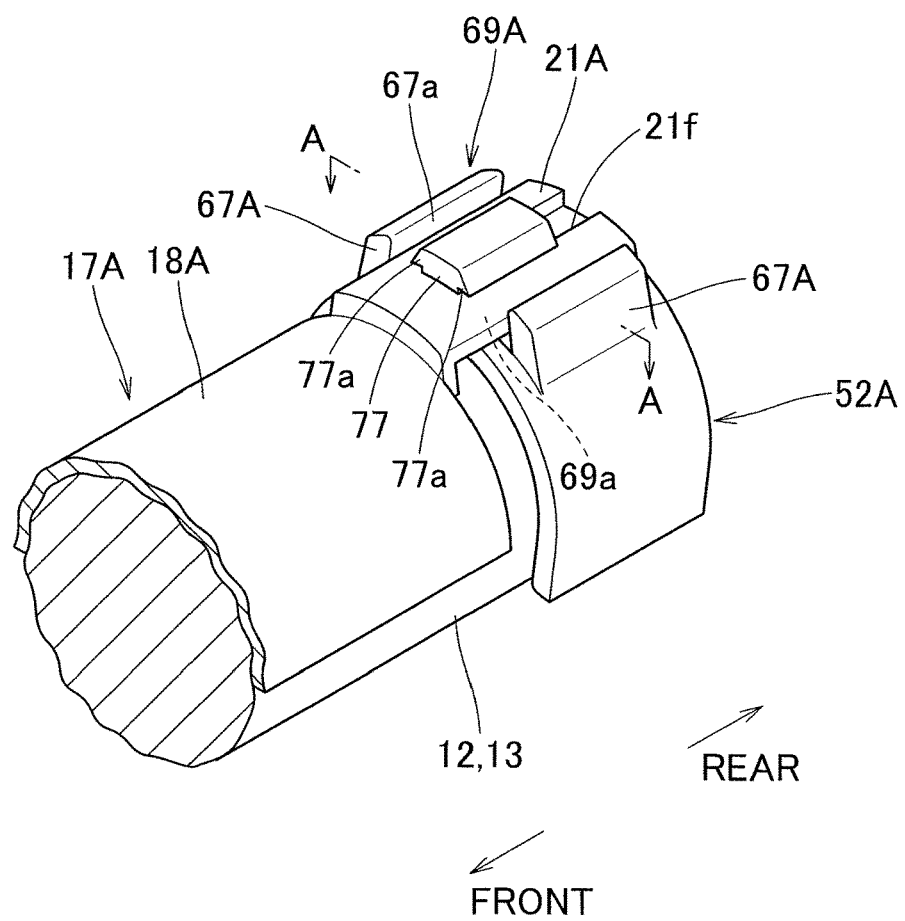
REAR
FRONT
Sectional View at A-A
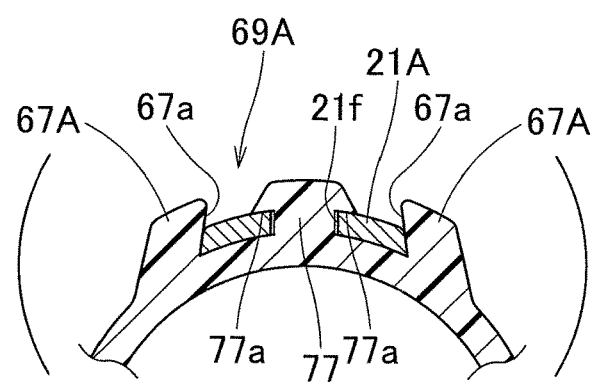

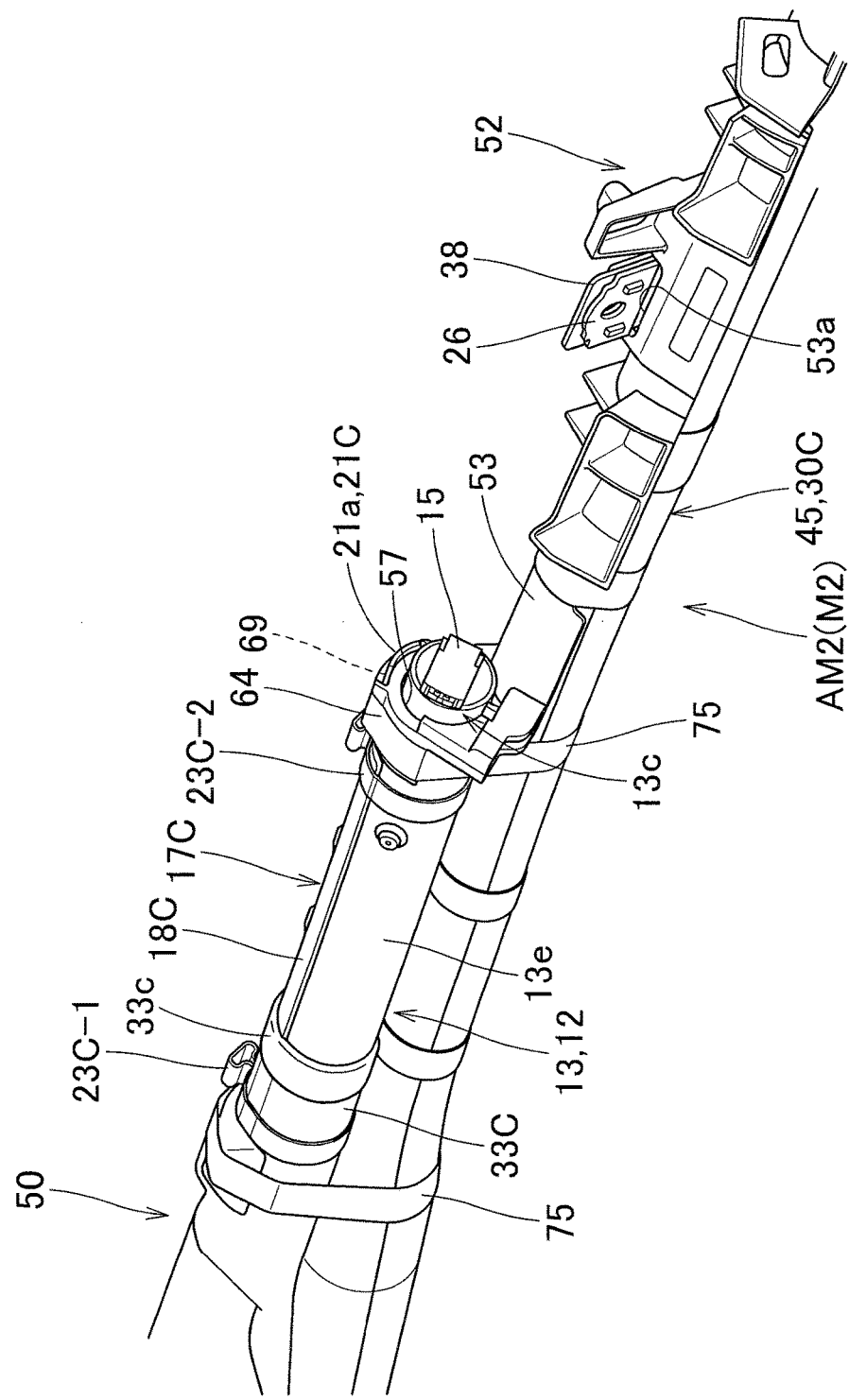

HEAD-PROTECTING AIRBAG DEVICE

CROSS REFERENCE TO RELATED APPLICATIONS

The Present application is a divisional of U.S. patent application Ser. No. 15/431,846 filed on Feb. 14, 2017, which is based upon and claims priority from Japanese Patent Application No. 2016-036274 of Konaka et al., filed on Feb. 26, 2016, and Japanese Patent Application No. 2016-140584 of Konaka et al., filed on Jul. 15, 2016, the entire disclosures of which are incorporated herein by reference.

BACKGROUND OF THE INVENTION

1. Field of the Invention

The present invention relates to a head-protecting airbag device that includes an airbag which is mountable on an upper periphery of a window of a vehicle in an elongate folded-up configuration and deployable over the window when actuated, an inflator for supplying the airbag with an inflation gas, a mounting bracket which mounts the inflator on a vehicle body structure at the upper periphery of the window, and a case fabricated of synthetic resin and housing the airbag in the folded-up configuration.

2. Description of Related Art

JP2015-30367 discloses a known head-protecting airbag device in which an airbag is stored in a case in an elongate folded-up configuration so as to be mounted on the upper periphery of a window as is stored in the case. In this airbag device, an inflator is assembled with the case preliminarily, and this assembly is mounted on the upper periphery of the window.

However, this conventional airbag device has a complicated assembling structure between the inflator and the case in which a mounting bracket mounted on the inflator and a mounting section of the case are firstly mated, and a band is wound around the inflator, the mounting bracket and the mounting section of the case.

Further, a folded-up body of the airbag for a head-protecting airbag device, which refers to a folded-up configuration of the airbag, is so elongate that a case cannot accommodate an entirety of the folded-up body, and a region of the airbag which is not covered with the case can be possibly mounted on the periphery of the window in a twisted state, which is not preferable. Accordingly, it has been desired to provide a new technology that prevents a torsion of the folded-up body of the airbag and facilitates an assembly of the inflator and the case.

SUMMARY OF THE INVENTION

The present invention has one of the object to provide a head-protecting airbag device that has an easy assembling structure between an inflator and a case and is capable of suppressing a torsion of a folded-up body of an airbag from occurring when mounted on the upper periphery of the vehicle window.

The object of the invention will be attained by the following head-protecting airbag device:

The head-protecting airbag device includes an airbag that is mountable on an upper periphery of a window of a vehicle inside the vehicle in such a folded-up configuration that is formed by bringing a lower edge of the airbag at deployment close to an upper edge of the airbag. The airbag is deployable over the window when fed with an inflation gas and includes an inlet region which protrudes upward out of an upper edge of an intermediate region in a front and rear direction of the airbag for taking in the inflation gas. The airbag device further includes an inflator for feeding the airbag with the inflation gas, a mounting bracket that is coupled with the inflator and mounts the inflator on a vehicle body structure at the upper periphery of the window, and a case that is fabricated of synthetic resin and houses the airbag in the folded-up configuration.

The inflator is generally cylindrical in shape and is so disposed as to extend along an axial direction of the airbag in the folded-up configuration. The inflator includes, at the first end in the axial direction, a gas discharge region that is coupled with the inlet region of the airbag and discharges the inflation gas into the airbag. The second end of the inflator is located outside of the inlet region of the airbag.

The case is mounted on a region of the airbag ranging from a vicinity of the second end of the inflator towards a direction away from the gas discharge region of the inflator.

The mounting bracket includes an insert region that extends towards the case at an outside of the inflator and fits in an assembling opening of the case. The assembling opening of the case includes a receiving region that receives the insert region of the mounting bracket along an axial direction of the inflator and a limiting plane that is located in a periphery of the receiving region and holds the insert region from rotating in both directions in a circumferential direction of the inflator. The fitting between the insert region and the assembling opening suppresses the airbag stored in the case in the folded-up configuration from rotating in both directions in the circumferential direction.

With the head-protecting airbag device of the invention, the inflator, which has been coupled with the airbag in the folded-up configuration and held by the mounting bracket, and the case mounted on the airbag can be assembled together in a simple fashion by moving the insert region of the mounting bracket along the axial direction of the inflator, i.e. along an axial direction of the airbag, and inserting it into the assembling opening of the case from the receiving region. This way the inflator and the case can be assembled together easily without using a band or the like which was used in a conventional head-protecting airbag device. Further, the fitting of the insert region into the assembling opening is easy because the insert region has only to be moved along the axial direction of the inflator or airbag. In the head-protecting airbag device of the invention, the insert region mated with the assembling opening is held from rotating around the inflator by the limiting plane of the assembling opening, thus helps suppress the airbag in the folded-up configuration from rotating in the circumferential direction. That is, the configuration that the insert region fits in the assembling opening prevents the case from moving in a twisting fashion with respect to the insert region, i.e. with respect to the inflator coupled with the mounting bracket. As a result, the airbag stored in the case in the folded-up configuration will also be prevented from twisting with respect to the inflator and a torsion in a region of the airbag located immediately beneath the inflator will also be prevented.

Therefore, the head-protecting airbag device of the invention has an easy assembling structure between the inflator and the case and is capable of suppressing a torsion in the airbag in the folded-up configuration from occurring when mounted on the upper periphery of the window.

In the head-protecting airbag device of the invention, it is desired that the case includes a support region that covers an outer circumferential plane of the inflator and is configured to extend generally along the circumferential direction of the inflator from an end of the insert region in the circumferential direction of the inflator, when the inflator is viewed from a direction on the part of the second end.

With this configuration, the support region of the case is disposed to expose the second end region of the inflator. This configuration will facilitate the connection work to connect a connector with lead wires for feeding an actuating signal to the second end of the inflator, when an airbag module, in which the inflator, the airbag and case are assembled together, is mounted on the upper periphery of the window of the vehicle.

If, when the inflator is viewed from the direction on the part of the second end, the support region is configured to extend generally along the circumferential direction of the inflator from both ends of the insert region of the mounting bracket in the circumferential direction of the inflator, the support region will suppress the inflator from moving with respect to the case in a direction orthogonal to the axis. In other words, the case will be suppressed from twisting in a clockwise direction or a counterclockwise direction about the axis of the inflator, (i.e. twisting with respect to the inflator in both directions in the circumferential direction of the inflator). Further, in the airbag device of the invention, the case is held from moving with respect to the inflator at two remote positions in a direction orthogonal to the axis of the inflator, i.e., on the inflator itself and at the insert region located at a distance from the inflator. This configuration will further steadily suppress a twisting movement of the case with respect to the inflator, thus further adequately suppress a twisting of the region of the airbag disposed immediately below the inflator.

Moreover, if the case includes an insert hole that receives a region in a vicinity of the second end of the inflator along the axial direction of the inflator, the insert region of the mounting bracket can be inserted into the assembling opening at the same time as the time the second end region of the inflator is inserted into the insert hole, which will further facilitate the assembling of the inflator and the case.

Furthermore, in the above head-protecting airbag device, it is desired that the assembling opening is composed of a through slot for receiving the insert region, and that the through slot is composed of a region enclosed by a pair of rising walls each of which includes the limiting plane and a holding region which extends from a leading end of at least one of the rising walls in such a manner as to hang over the insert region and holds an outer surface of the insert region.

This configuration will further facilitate the mating work of the insert region and the through slot because the insert region easily fits in the through slot such that the outer circumference of the insert region is covered with the periphery of the through slot, i.e. by the limiting planes of the rising walls and the holding region, merely by moving the insert region along the axial direction of the inflator and inserting it into the through slot.

In this instance, the holding region may be either configured to extend from the leading ends of both of the rising walls, or configured to connect the leading ends of the rising walls.

Further alternatively, the case may include a retaining projection that penetrates the insert region and retains the insert region.

Another object of the invention is to provide a head-protecting airbag device in which an inflator and an airbag are securely coupled together through the use of a clamping member, without any special treatment on the outer circumference of the inflator and without a fear of decoupling.

Such a head-protecting airbag device includes an airbag which is mountable on an upper periphery of a window of a vehicle inside the vehicle for deployment over the window, a generally cylindrical inflator which includes a gas discharge region and feeds an inflation gas into the airbag, and a mounting bracket for holding and mounting the inflator on a vehicle body structure at the upper periphery of the window.

The airbag includes a generally tubular inlet region, and the inflator is connected with the inlet region of the airbag.

The mounting bracket includes a retaining region which holds the inflator and a bag-connecting region which helps connect the inlet region of the airbag to the inflator. The bag-connecting region is disposed at a region of the retaining region in a vicinity of the gas discharge region of the inflator, and includes:

a first fastened region which is in contact with an outer circumference of the inflator on the inner circumferential plane and is wound by an annular first clamping member on the outer circumference; and a protruding region which is located farther towards a discharge direction of the inflation gas than the first fastened region and is formed partially in a circumferential direction of the inflator. The protruding region includes a step plane which rises outwardly from the first fastened region.

The airbag and the inflator are clamped together at the first fastened region of the mounting bracket by the first clamping member wound around the inlet region of the airbag with the protruding region and first fastened region of the mounting bracket and a region of the inflator in a vicinity of the gas discharge region disposed inside the inlet region.

In the above head-protecting airbag device, the mounting bracket includes the bag-connecting region which includes the first fastened region which is in contact with the outer circumference of the inflator on the inner circumferential plane and is wound by the first clamping member on the outer circumference, and the protruding region which includes the step plane that rises outwardly from the first fastened region. The protruding region of the mounting bracket and the region of the inflator in the vicinity of the gas discharge region are inserted into the inlet region of the airbag, and clamping by the clamping member is done in that state. In the above head-protecting airbag device, the protruding region is disposed farther towards the discharge direction of the inflation gas than the first fastened region around which the clamping member is mounted. With this configuration, even in the event that a gas pressure of the inflation gas radially enlarges the clamping member and its tightening force is lowered, the protruding region (more precisely, the step plane) will prevent the clamping member from moving towards the discharge direction of the inflation gas and helps retain the inlet region of the airbag between the step plane and the clamping member. Thus decoupling of the inlet region from the inflator will be adequately prevented.

Therefore, the configuration of the above airbag device will provide a secure coupling of the inflator and the inlet region of the airbag through the use of a clamping member, without any special treatment on the outer circumference of the inflator and without a fear of decoupling.

Further, in the above head-protecting airbag device, the protruding region of the mounting bracket is formed only partially in a circumferential direction of the inflator, not over an entire circumference of the inflator. This configuration will facilitate an inserting work of the inflator together with the protruding region of the mounting bracket into the inlet region of the airbag, in comparison with an instance where the protruding region is formed over an entire circumference of the inflator.

The protruding region for a secure coupling of the inflator and the airbag is preferably formed at the leading end of the mounting bracket.

In the above head-protecting airbag device, it is desired that the protruding region includes an enlarging region which is radially outwardly enlarged relative to the first fastened region and a circumferential wall region which extends further from the enlarging region along an axial direction of the inflator. In the protruding region for preventing decoupling of the airbag from the inflator, it may be also conceivable to bend and raise an end region of the fastened region outwardly. However, such a configuration is likely to cause lack of rigidity of the protruding region or worsen the work efficiency in inserting the protruding region into the airbag. Therefore, it is more preferable that the protruding region includes the enlarging region that is radially outwardly enlarged relative to the first fastened region and the circumferential wall region that extends further from the enlarging region along the axial direction of the inflator.

This way the plane of the enlarging region facing towards the first fastened region serves as the step plane and the protruding region has an enhanced rigidity because of the circumferential wall. Moreover, since the terminal of the protruding region faces forward along the axial direction, not radially outwardly as in the enlarging region, the protruding region will go smoothly into the inlet region without getting stuck with the inlet region, and an inserting work of the protruding region will be facilitated in comparison with an instance where the terminal of the protruding region faces radially outwardly. If the protruding region further includes a contracted region which is bent inward at the leading end of the circumferential wall such that the end plane of the protruding region faces towards the inflator, the work efficiency in the inserting work of the protruding region will be further improved.

It is further desired, in the above head-protecting airbag device, that the mounting bracket further includes a second fastened region that is formed at an opposite side to the first fastened region in an axial direction of the retaining region, and that the second fastened region is clamped against the inflator by a second clamping member without the airbag disposed at an inner circumference of the second clamping member.

With the above configuration, since the first clamping member is adequately prevented from being decoupled from the mounting bracket by forming the protruding region on the mounting bracket, only one clamping member will be sufficient to couple the airbag and inflator against the mounting bracket without a fear of decoupling. In other words, there is no need of another clamp for stopping decoupling of the airbag and inflator at the first fastened region. Accordingly, with the second fastened region where only the inflator is coupled to the mounting bracket, mounting of the airbag and the inflator on the mounting bracket can be done with two clamping members, i.e. with the first clamping member which clamps the airbag as well as the inflator at the first fastened region and the second clamping member which clamps only the inflator against the mounting bracket at the second fastened region.

It is further preferable, in the above airbag device, that a same clamping member can be used as the first clamping member and the second clamping member, and that a length in a circumferential direction of the second fastened region, against which only the inflator is clamped, is longer than a length in a circumferential direction of the first fastened region, against which the airbag and inflator are clamped.

This configuration will resolve the problem of the above head-protecting airbag device that, due to the absence of the airbag at the second clamping member, there is a difference between the first clamping member and the second clamping member in volume of the object of tightening, i.e. in condition for obtaining a predetermined tightening force in a tightening work of the clamp, and will further contribute to commonization of the clamping members, easy parts management and efficiency improvement in a tightening work of the clamps.

Furthermore, in the above head-protecting airbag device, the inlet region of the airbag is preferably provided, at the hem of the opening, with a thickened region which is formed by doubling a cloth member forming the inlet region and integrating the doubled cloth member. Such a thickened region will bump against the clamping member and prevent the airbag from being decoupled from the inflator even in the event that the airbag moves in a decoupling direction when a gas pressure of the inflation gas radially enlarges the clamping member and lowers the tightening force of the clamping member.

BRIEF DESCRIPTION OF DRAWINGS

FIG. 16 is a schematic partial enlarged perspective view showing a fitting of an inflator and a case in an alternative embodiment;

FIG. 28 depicts the case which houses the airbag and is assembled with the inflator in the another embodiment, by schematic partial enlarged perspective view.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
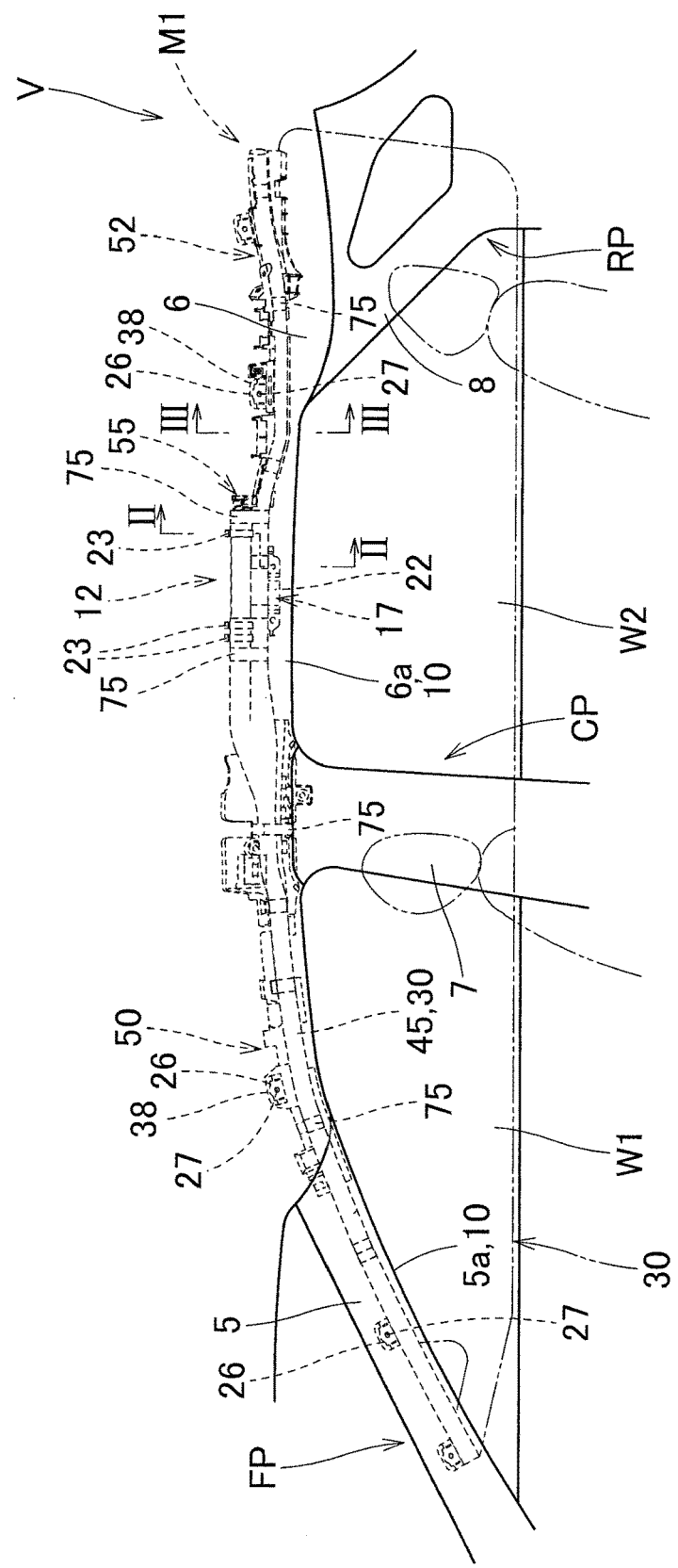
FIG. 1 is a schematic front elevation of a head-protecting airbag device embodying the invention as viewed from a vehicle interior.

As shown in FIG. 1, a head-protecting airbag device M1 embodying the present invention is mounted on a vehicle V with two side windows W1 and W2 and a middle pillar CP disposed between the windows W1 and W2 (between a front pillar FP and a rear pillar RP). An airbag 30 of the head-protecting airbag device M1 is stored inside the upper peripheries of the windows W1 and W2 in a folded-up configuration. In other words, the airbag device M1 is stored in a region ranging from the front pillar FP to an upper region of the rear pillar RP, via a roof-side rail RR. As indicated with double-dotted lines in FIG. 1, the airbag 30 is configured to be deployed over not only the windows W1 and W2 but also a part of a middle pillar garnish 7, which covers the middle pillar CP, and a part of a rear pillar garnish 8, which covers the rear pillar RP.

Figure 2:
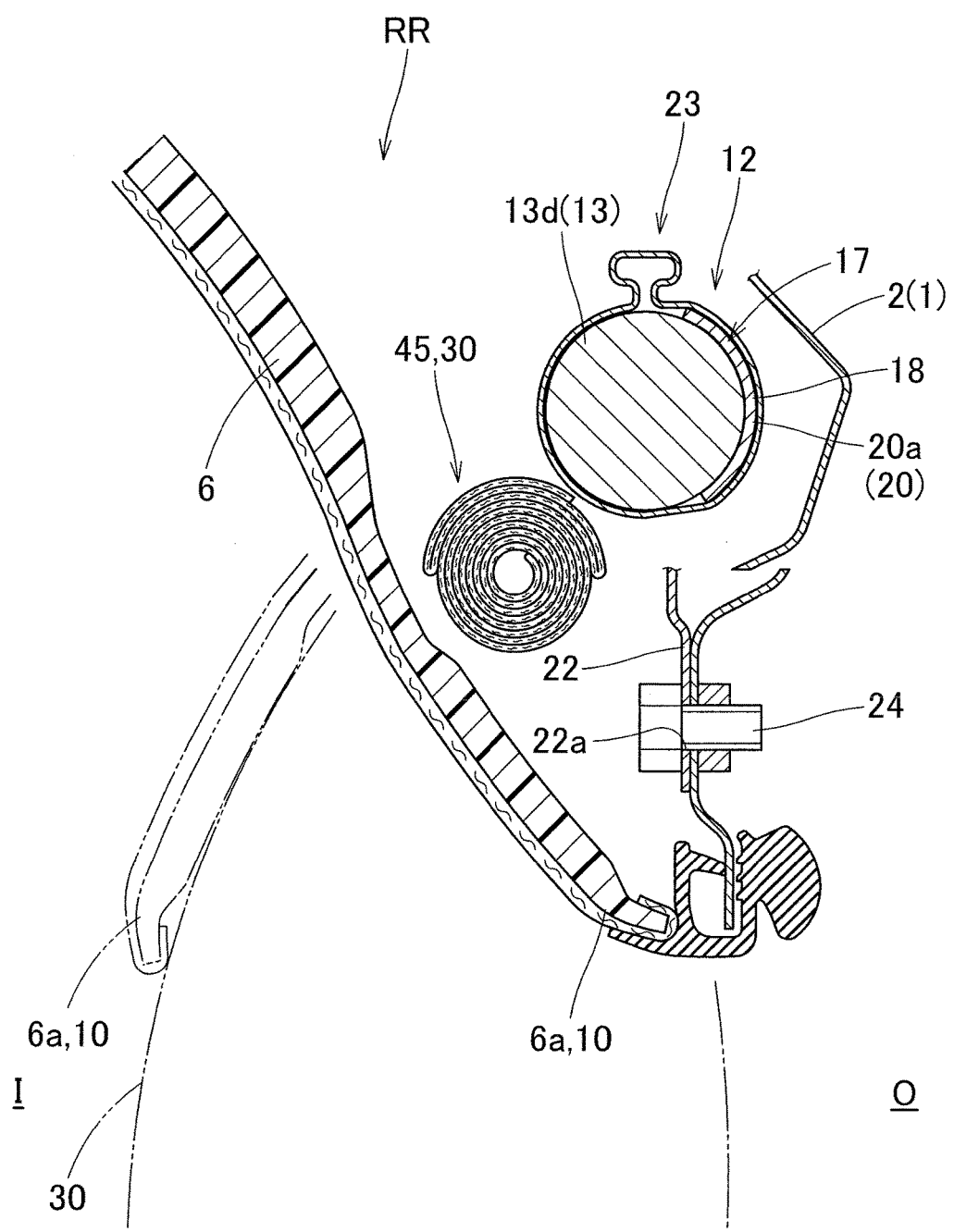
FIG. 2 is a vertical sectional view of the airbag device as mounted on a vehicle, taken along line II-II of FIG. 1.
Figure 3:
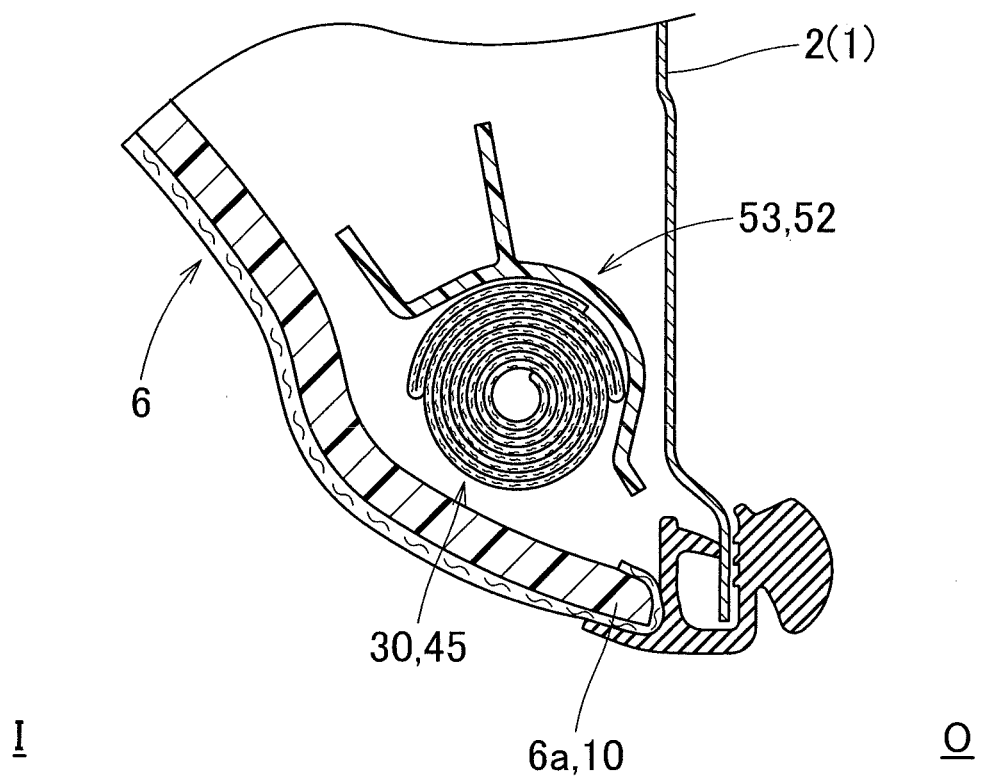
FIG. 3 is a vertical sectional view of the airbag device as mounted on a vehicle, taken along line of FIG. 1.

As shown in FIGS. 1 to 3, the airbag device M1 includes the airbag 30, an inflator 12 for feeding the airbag 30 with an inflation gas, a mounting bracket 17, a plurality of mounting brackets 26, mounting bolts 24 and 27, a clamp 23, a case 50 and a case 52 for housing a folded-up body 45 which is formed by folding up the airbag 30. As shown in FIGS. 1 to 3, when the airbag device M1 is mounted on the vehicle V, the airbag 30 (in the shape of the folded-up body 45), inflator 12, cases 50 and 52 and mounting brackets 17 and 26 are covered by an airbag cover 10 on the inboard side. The airbag cover 10 of the illustrated embodiment is composed of a lower hem 5a of a front pillar garnish 5 covering the front pillar FP and a lower hem 6a of a roof head liner 6 covering the roof side rail RR.

The front pillar garnish 5 and roof head liner 6 are fabricated of synthetic resin, similarly to the middle pillar garnish 7 and rear pillar garnish 8. The front pillar garnish 5 and roof head liner 6 are mounted on an inboard side of an inner panel 2, which is part of the vehicle body structure 1, with the aid of not-shown mounting means. As indicated with double-dotted lines in FIG. 2, the airbag cover 10, which is composed of the lower hems 5a and 6a of the front pillar garnish 5 and roof head liner 6, is openable toward an interior of the vehicle so as to allow airbag emergence when pushed by the airbag 30.

Figure 11:
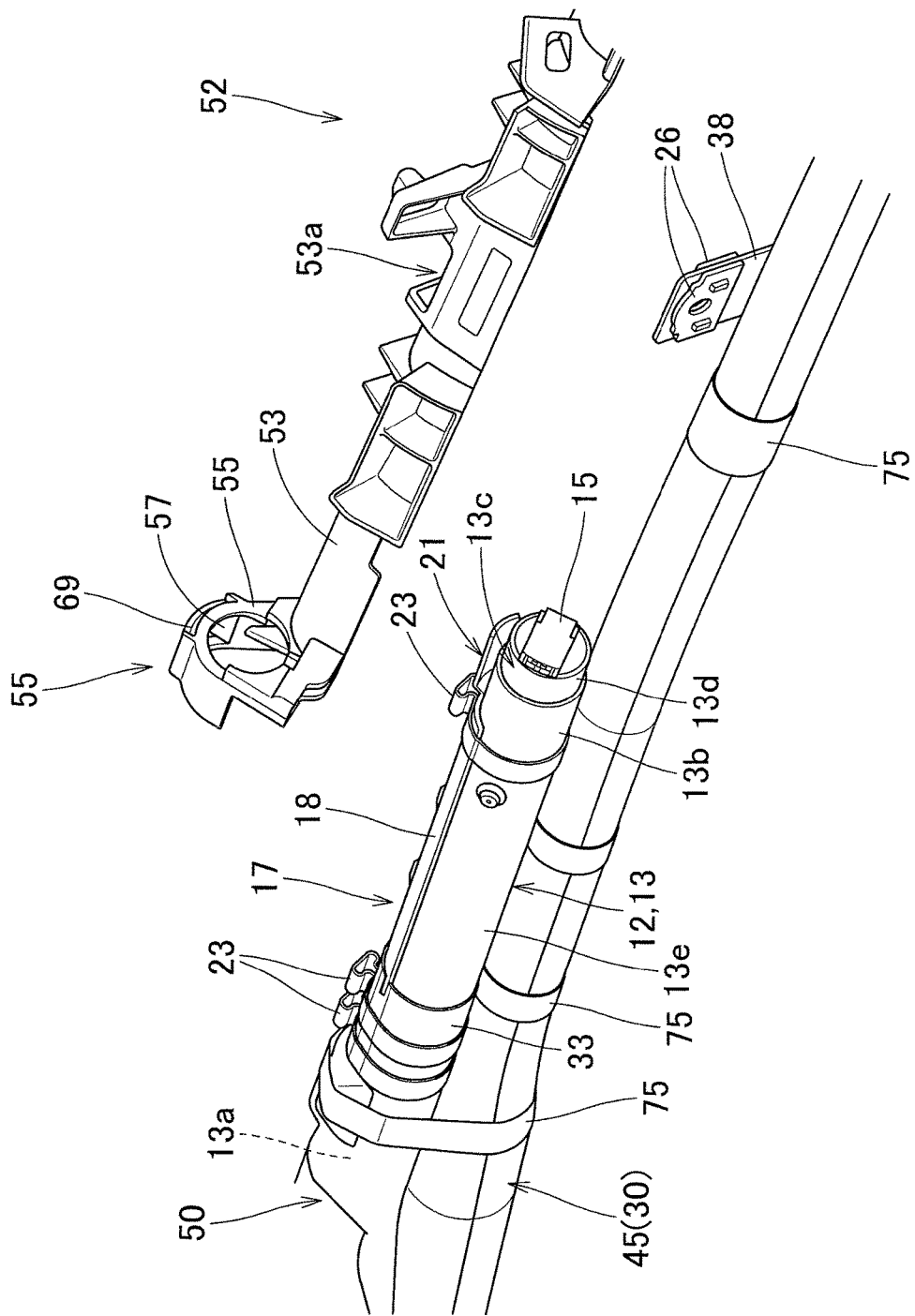
FIG. 11 shows a folded-up body formed by folding the airbag and the case laid side by side, by schematic partial enlarged perspective view.
Figure 12:
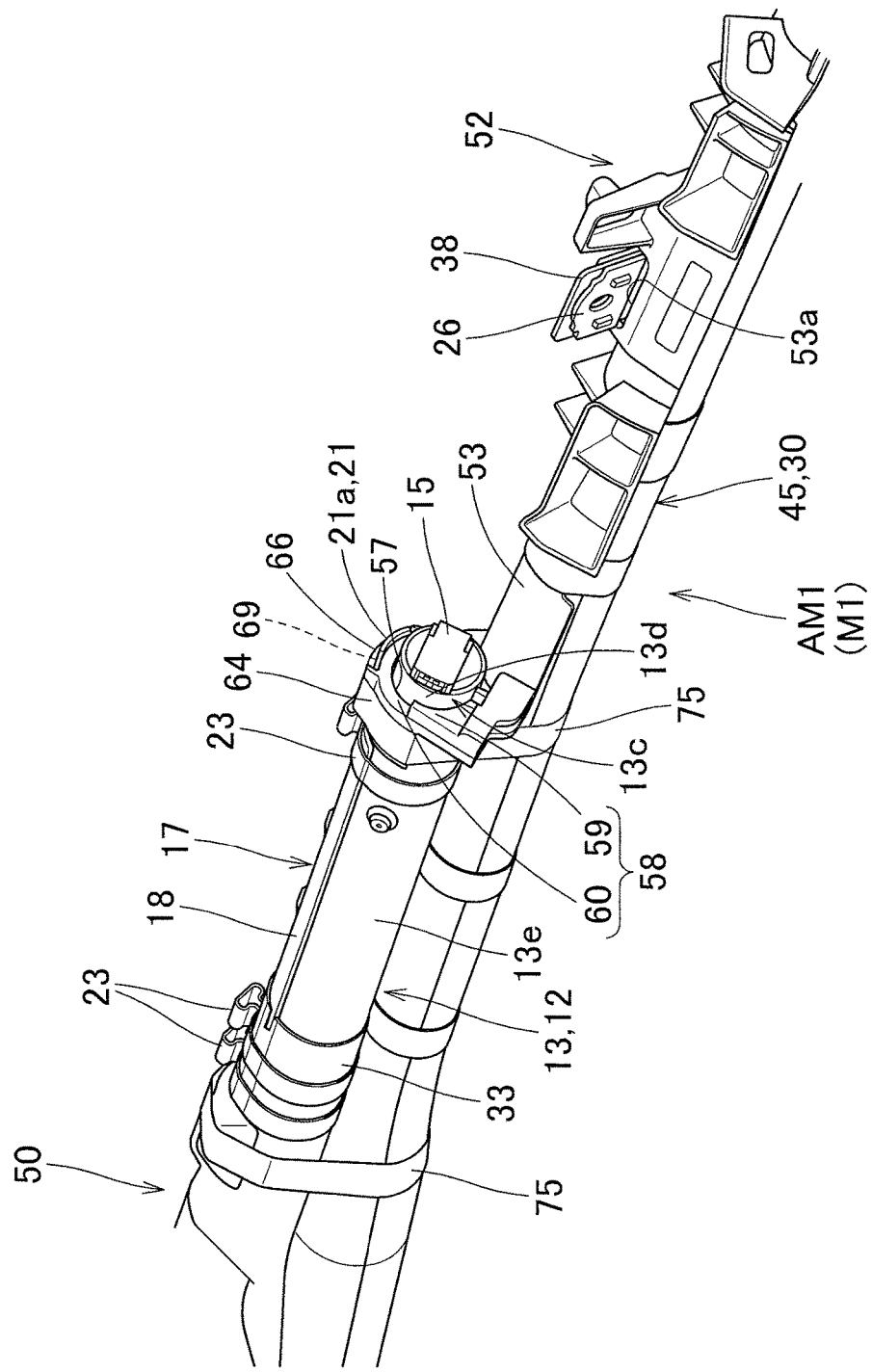
FIG. 12 depicts the case which houses the airbag and is assembled with the inflator, by schematic partial enlarged perspective view.
Figure 14:
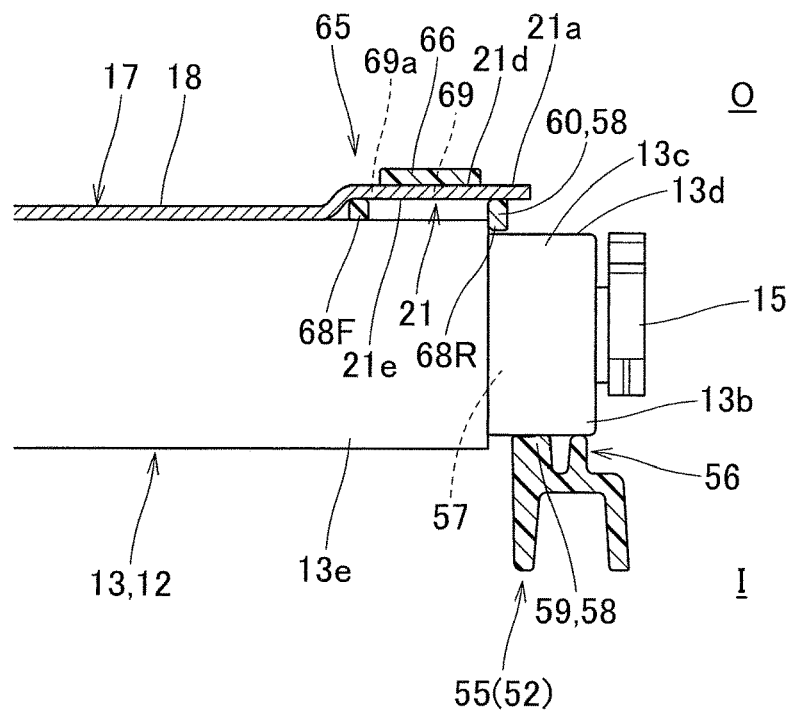
FIG. 14 is a partial enlarged horizontal section showing the fitting of the inflator and case, taken along a front and rear direction.

As shown in FIG. 1, the inflator 12 is generally cylindrical in shape and is so disposed as to extend along an axial direction of the folded-up body 45. In the illustrated embodiment, as shown in FIGS. 1, 2 and 12, the inflator 12 is disposed adjacent and along the folded-up body 45 at a region above a central region in a front and rear direction of the folded-up body 45 and at a region above the window W2. As indicated with double-dotted lines in FIG. 8, the inflator 12 includes a generally cylindrical body 13, a gas discharge region 14 located at a first end in an axial direction of the body 13, and a connection port 15 located at a second end in an axial direction of the body 13. In the illustrated embodiment, the gas discharge region 14 is disposed at the front end 13a of the body 13, and has a smaller diameter than the body 13. The gas discharge region 14 is provided with a plurality of gas discharge ports (not shown) for discharging an inflation gas. The connection port 15 is located at the rear end 13b of the body 13 for receiving a not-shown connector to which lead wires for feeding an actuating signal are connected. In the illustrated embodiment, the inflator 12 is assembled with the airbag 30 with the aid of a clamp 23 in such a manner that the region in a vicinity of the front end 13a of the body 13 including the gas discharge region 14 is set inside a later-described inlet region 33 of the airbag 30 while the region in a vicinity of the rear end 13b of the body 13 including the connection port 15 is located outside of the inlet region 33. The clamps 23 are used to fasten the airbag 30 and inflator 12 at the rear end 33a of the inlet region 33, as shown in FIG. 11. The body 13 of the inflator 12 includes a main region 13e and a rear end region 13c which is disposed towards the connection port 15 and has a smaller diameter than the main region 13e such that a step is formed between the main region 13e and the rear end region 13c, as shown in FIG. 14. The inflator 12 is mounted on the inner panel 2 with the aid of the mounting bracket 17, clamps 23 and mounting bolts 24 which fasten the mounting bracket 17 to the inner panel 2.

The mounting bracket 17 is made of sheet metal, and is disposed on an outboard side of the inflator 12, as shown in FIG. 2. More specifically, as shown in FIGS. 8 and 9, the mounting bracket 17 includes a support region 18 which supports the outboard side of the inflator body 13, a mounting region 22 which extends downward from the support region 18 and is mounted on the inner panel 2, and an insert region 21 extending rearward from the rear end of the support region 18.

Figure 8:
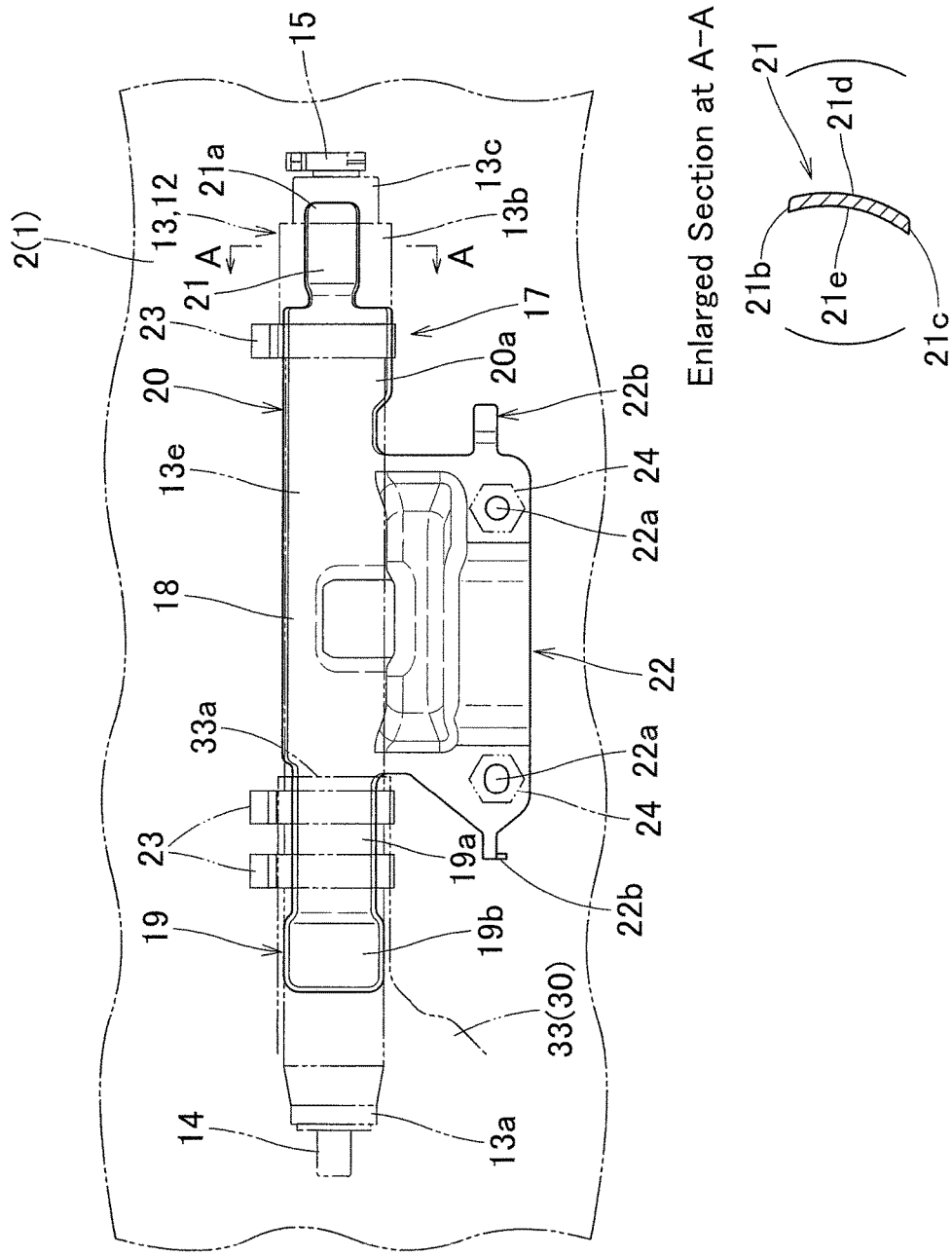
FIG. 8 is a front elevation of a mounting bracket for use in the airbag device of FIG. 1.
Figure 9:
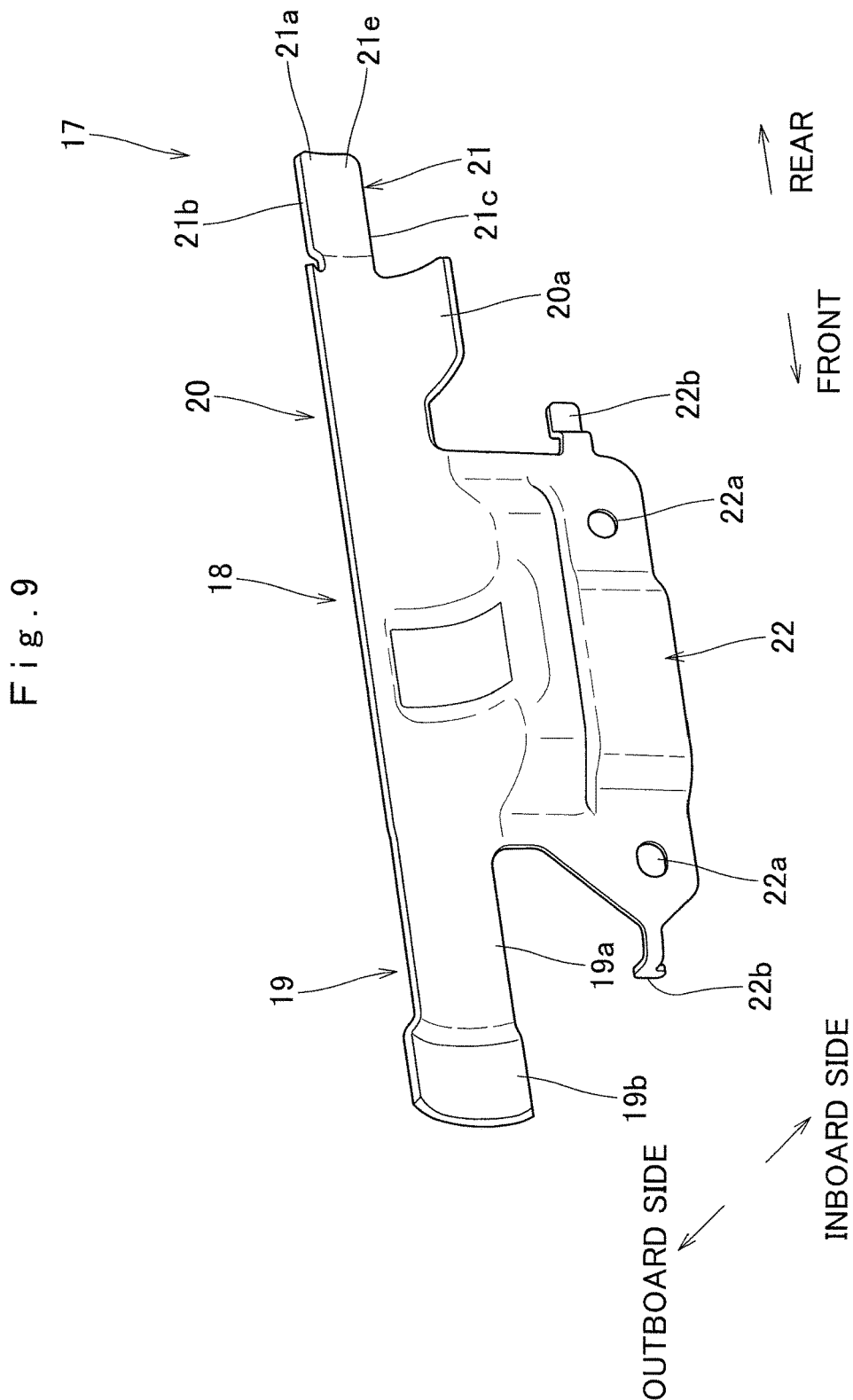
FIG. 9 is a schematic perspective view of the mounting bracket of FIG. 8.

As shown in FIG. 8, the support region 18 is elongate generally in a front and rear direction, and is greater than the mounting region 22 in dimension in a front and rear direction so as to cover a region of the inflator body 13 except the front and rear end regions. As shown in FIG. 2, the support region 18 is formed to curve along an outer circumference of the inflator body 13 and fit the outer circumference of the inflator body 13 generally exactly. The support region 18 and the inflator body 13 are assembled together with the clamps 23 which are mounted around the main body 13 and support region 18. More specifically, a total of three such clamps 23 are used as indicated with double-dotted lines in FIG. 8; two of them are used at a front end region 19 of the support region 18 which is located farther forward than the mounting region 22, and a remaining clamp 23 is used at a rear end region 20 of the support region 18 which is located farther rearward than the mounting region 22. The front end region 19 of the support region 18 is a region to be inserted into the inlet region 33 of the airbag 30 together with the inflator 12. Accordingly, the two clamps 23 used at the front end region 19 are located outside of the inlet region 33 of the airbag 30 to couple the inlet region 33 and the inflator 12 as well as couple the inflator 12 and the mounting bracket 17, as shown in FIG. 11. The root region (or rear region, which is disposed towards the mounting region 22) of the front end region 19 serves as a fastened region 19a fastened with the clamps 23 as shown in FIG. 8. As shown in FIG. 9, the leading-end region (or front region) of the front end region 19 serves as a raised region 19b which is disposed at a farther outboard position than the fastened region 19a due to a step formed between the raised region 19b and the fastened region 19a. The raised region 19b helps hold the clamps 23 mounted around the fastened region 19a in place. A rear end area of the rear end region 20, which is located away from the mounting region 22, serves as a fastened region 20a fastened by the clamp 23, as shown in FIG. 8. The fastened region 20a is greater in width than other region (a front area) of the rear end region 20.

The mounting region 22 is configured to be disposed on a lower region of a generally central region in a front and rear direction of the inflator 12. As shown in FIGS. 2 and 8, the mounting region 22 is provided with two insert holes 22a for receiving the bolts 24 for fastening to the inner panel 2, at two spaced positions in a front and rear direction. The mounting region 22 further includes, each at the front and rear edges, a retaining pawl 22b protruding towards an outboard direction, i.e. towards the inner panel 2. Each of the mounting pawls 22b is retained by a peripheral region of a not-shown retaining hole provided on the inner panel 2 for positioning the mounting bracket 17 temporarily.

The insert region 21 extends rearward generally along the axial direction of the inflator 12 (i.e. along a front and rear direction) from the rear end of the support region 18 and is inserted into a later-described through slot 69 formed on the case 52. More specifically, as indicated with double-dotted lines in FIG. 7, the support region 18 and insert region 21 are formed in an uneven fashion, thus, the insert region 21 extends rearward at a farther outboard position than the support region 18, in such a manner as to form a clearance between the insert region 21 and an outer circumferential plane of the inflator body 13 when the support region 18 is mounted on the inflator 12. Further, the insert region 21 is formed to curve along the curvature of the outer circumferential plane of the inflator body 13 (FIGS. 6 and 9), and has a smaller width in a circumferential direction of the inflator 12 than the support region 18 so as to fit in the through slot 69. As shown in FIG. 14, the length in a front and rear direction of the insert region 21 is configured such that the leading end 21a region can be inserted through the through slot 69 when assembled with the case 52 and the leading end 21a is disposed farther rearward than the main region 13e of the inflator body 13 and farther forward than the rear end of the rear end region 13c when the support region 18 and inflator 12 are mated.

Each of the mounting brackets 26 is composed of a pair of plates of metal, which are applied to inboard and outboard sides of each of later-described mounting tabs 38 of the airbag 30, as shown in FIGS. 11 and 12. Mounting bolts 27 secure the mounting brackets 26, together with the mounting tabs 38 of the airbag 30, to the inner panel 2, as shown in FIG. 1.

As indicated with double-dotted lines in FIG. 1, the airbag 30 is designed to unfold and inflate from a folded-up configuration when fed with an inflation gas from the inflator 12 so as to cover the inboard sides of the windows W1, W2 and pillar garnishes 7 and 8 of the middle pillar CP and rear pillar RP. As shown in (A) of FIG. 10, the airbag 30 includes a gas admitting region 31 which admits an inflation gas and is inflated in such a manner as to separate an inboard side wall 31a from an outboard side wall 31b, and a non-admitting region 36 which is so formed that the inboard side wall 31a and outboard side wall 31b are attached together and admits no inflation gas. In the illustrated embodiment, the gas admitting region 31 includes a protection region 32 and an inlet region 33 while the non-admitting region 36 includes a peripheral region 37, a plurality of mounting tabs 38, panel regions 39 and 40 and closed regions 41.

Figure 10:
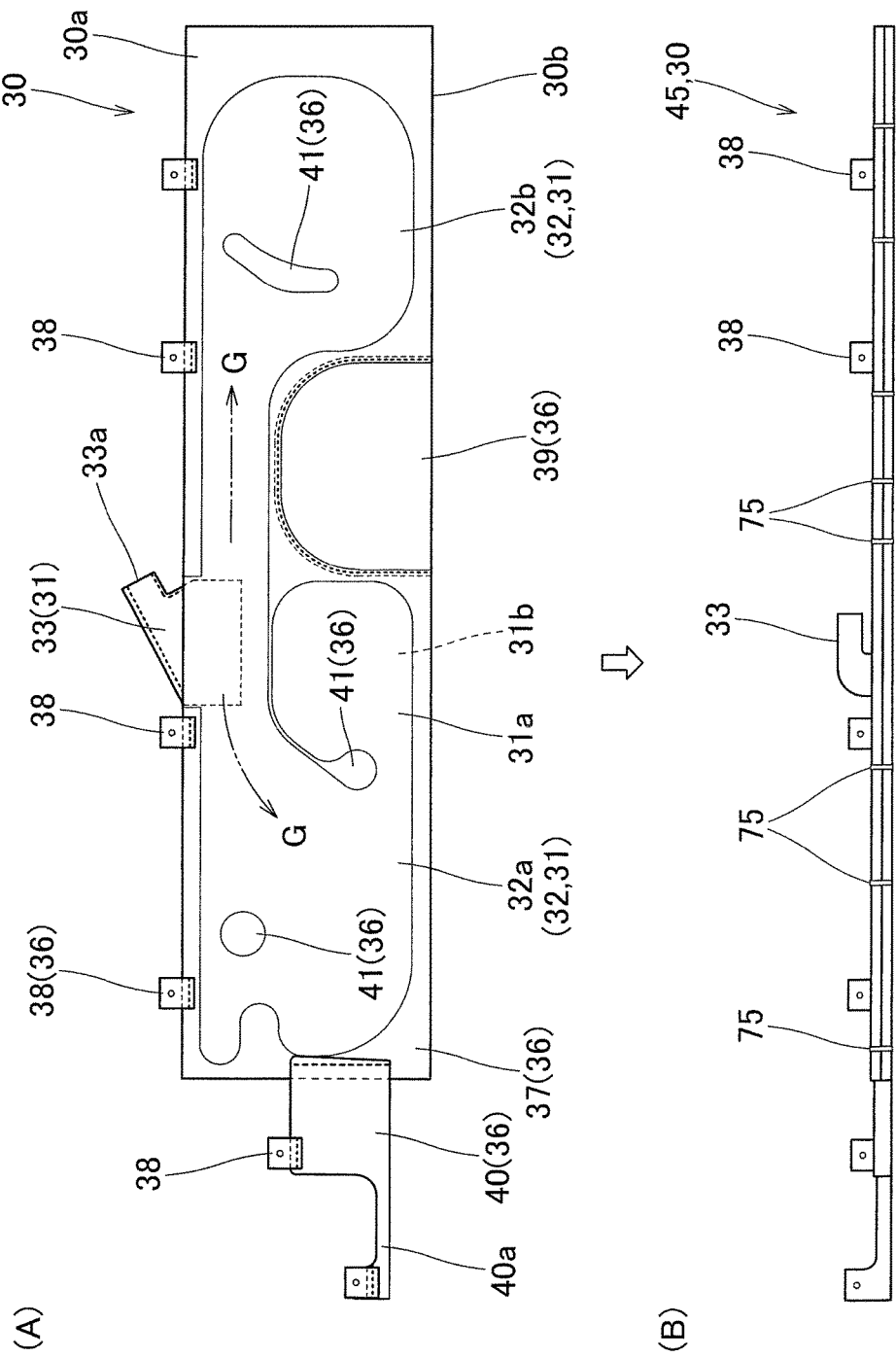
FIG. 10 shows an airbag for use in the airbag device of FIG. 1 in an unfolded and flatted state and the airbag folded-up and wrapped by wrapping members, by front views.

As shown in (A) of FIG. 10, the protection region 32 includes a front protection region 32a deployable over the window W1 at a side of the front seat and a rear protection region 32b deployable over the window W2 at a side of the rear seat. The inlet region 33 protrudes upward out of the upper edge of an intermediate region of the airbag 30 except the front and rear end regions. The inlet region 33 of the illustrated embodiment is formed proximate the rear end of the front protection region 32a, i.e. in a vicinity of the center in a front and rear direction of the airbag 30. The inlet region 33 is formed to protrude rearward and upwardly out of the upper edge 30a of the airbag 30, and is coupled to the inflator 12 at the rear end 33a. When the airbag 30 is fully inflated, the width in a front and direction of each of the front protection region 32a and rear protection region 32b is reduced compared to that in an uninflated state. The front protection region 32a and rear protection region 32b are provided with closed regions 41 which are formed by attaching the inboard side wall 31a and outboard side wall 31b together and help limit the thicknesses as inflated so the airbag 30 is inflated into a panel shape elongated in a front and rear direction.

The peripheral region 37 of the non-admitting region 36 is so formed as to enclose the gas admitting region 31 all over except the rear end 33a of the inlet region 33. The panel region 39 is disposed between the front protection region 32a and rear protection region 32b, and has a generally rectangular plate shape. The panel region 40 is located at the front end of the airbag 30 and has a generally rectangular plate shape. The panel region 40 is provided, at the lower end, with a belt 40a which is formed into a generally band and extends forward.

The mounting tabs 38 are disposed at the upper edge 30a of the airbag 30 as fully deployed for mounting the upper edge 30a of the airbag 30 on the inner panel 2 (i.e. the vehicle body structure 1). A plurality (six, in this specific embodiment) of the mounting tabs 38 are formed along the upper edge 30a of the airbag 30, including those formed on the belt 40a of the panel region 40. As described above, the mounting tabs 38 are secured to the inner panel 2 with the aid of the mounting brackets 26 and bolts 27.

The airbag 30 is mounted on the vehicle V in the shape of the folded-up body 45 which are elongate in a front and rear direction, as shown in (B) of FIG. 10. The folded-up body 45 is formed by folding up the airbag 30, from an unfolded and flattened state in which the inboard side wall 31a and outboard side wall 31b overlap each other, in such a manner as to bring the lower edge 30b close to the upper edge 30a. As shown in FIGS. 2 and 3, the region in a vicinity of the upper edge 30a of the airbag 30 is folded in a bellows fashion while the lower region is rolled on the outboard side wall 31b starting from the lower edge 30b. As shown in (B) of FIG. 10, the mounting tabs 38 and inlet region 33 protrude out of the upper plane of the folded-up body 45.

The cases 50 and 52 for housing the airbag 30 in a folded-up configuration (i.e. folded-up body 45) are fabricated of thermoplastic elastomer. The cases 50 and 52 of the illustrated embodiment are fabricated of thermoplastic polyolefin (TPO). As shown in FIG. 1, the airbag device M1 includes the case 50 for housing a region of the folded-up body 45 disposed in front of the inflator 12, in addition to the case 52 disposed at the rear of the inflator 12. In this specification, a detailed description of the case 50 will be omitted.

Figure 4:
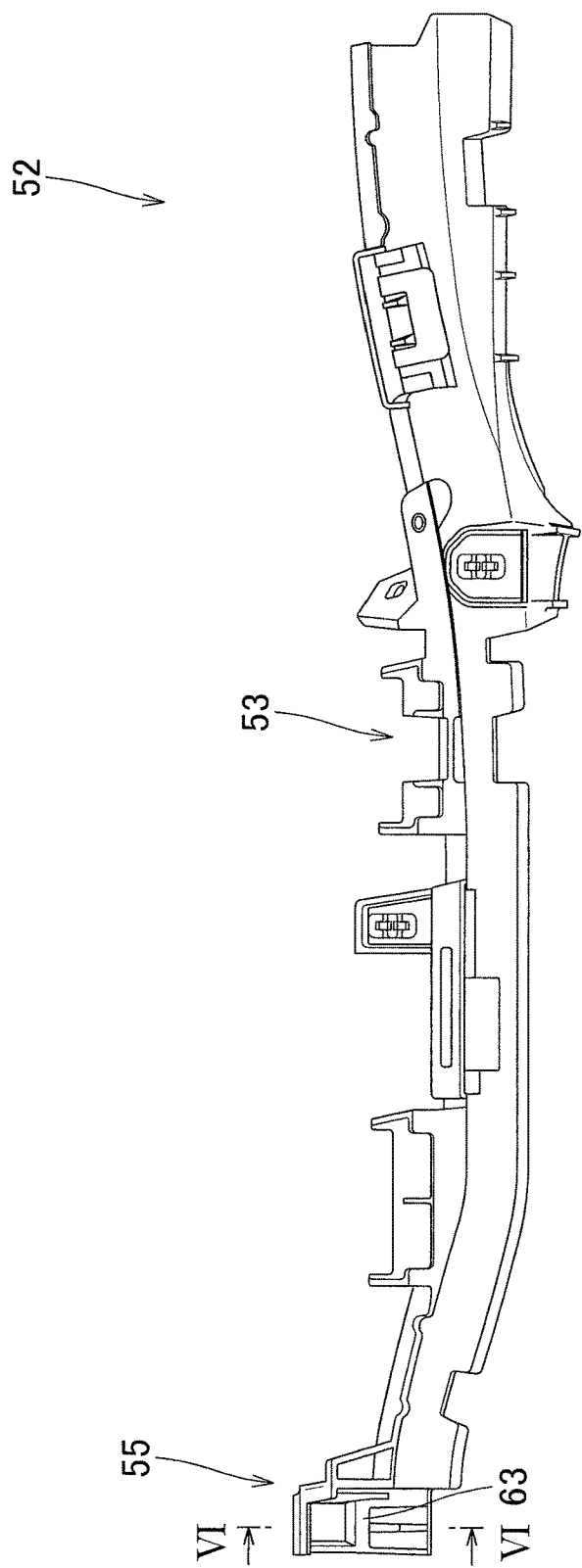
FIG. 4 is a front elevation of a case for use in the airbag device of FIG. 1.
Figure 5:
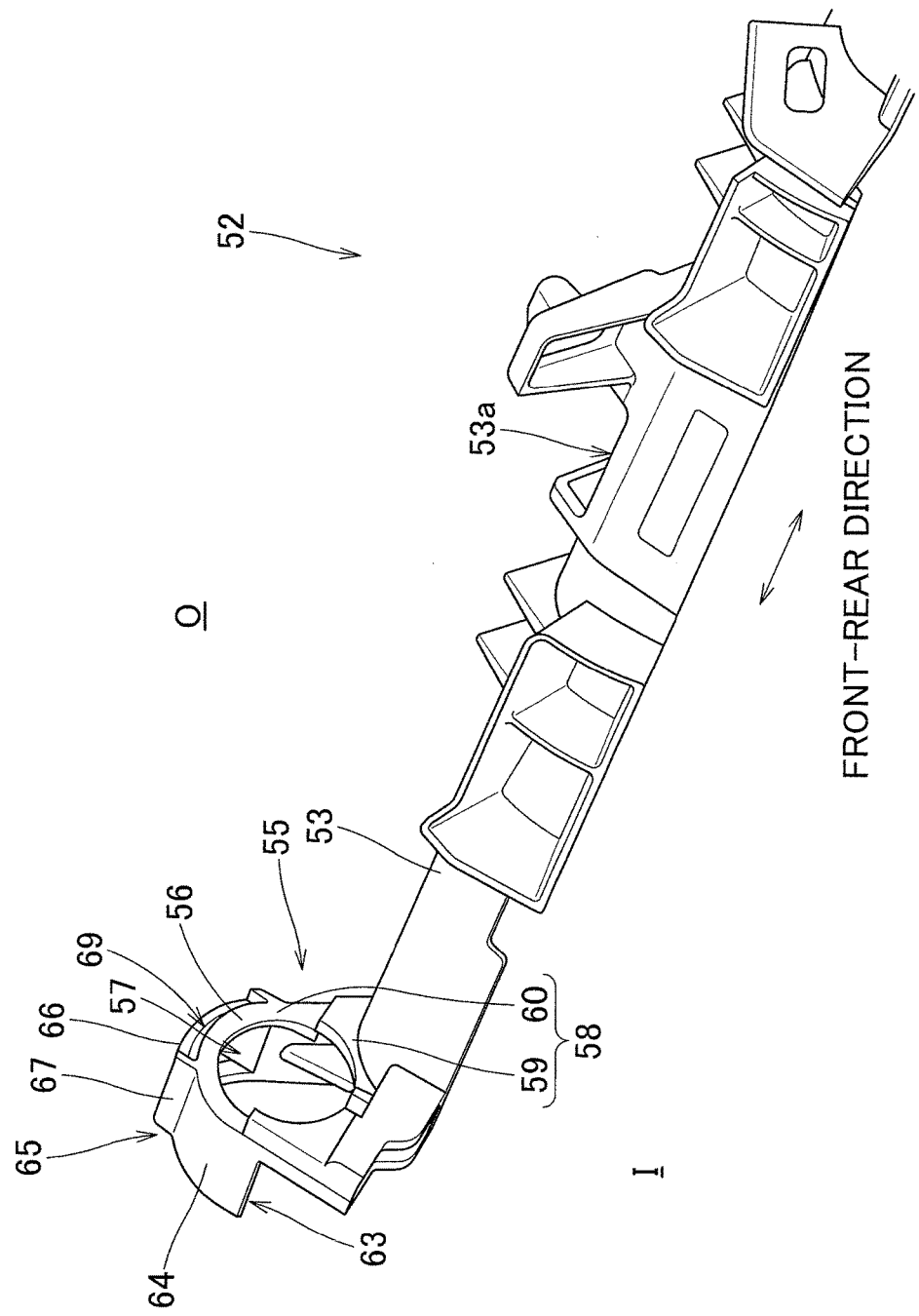
FIG. 5 is a partial enlarged schematic perspective view of the case of FIG. 4.

The case 52 is disposed at a region of the folded-up body 45 ranging from a vicinity of the rear end 13b of the inflator 12 towards a direction facing away from the gas discharge region 14 in a front and rear direction (i.e. at a region of the folded-up body 45 ranging rearward from a vicinity of the rear end 13b of the inflator 12). In the illustrated embodiment, the case 52 is configured to cover a region of the folded-up body 45 from the rear end 13b of the inflator 12 to the rear end of the folded-up body 45. As shown in FIGS. 4 and 5, the case 52 includes a storage region 53 for housing the folded-up body 45 and a connecting region 55 disposed at the front end for coupling with the inflator 12.

As shown in FIG. 3, the storage region 53 is configured to cover an upper side and an outboard side of the folded-up body 45. The storage region 53 is provided with a plurality of openings 53a for accommodating the mounting tabs 38 coupled with the mounting brackets 26, as shown in FIGS. 5, 11 and 12.

Figure 6:
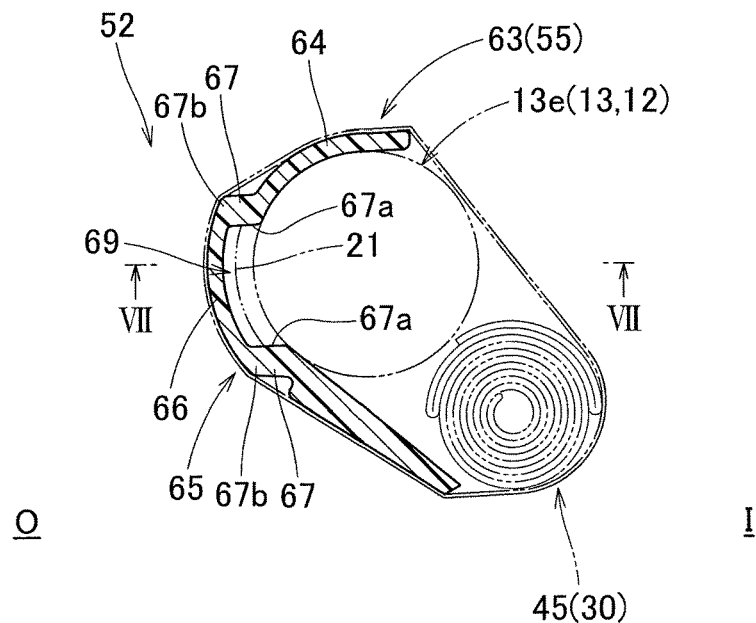
FIG. 6 is a partial enlarged end sectional view taken along line VI-VI of FIG. 4.
Figure 7:
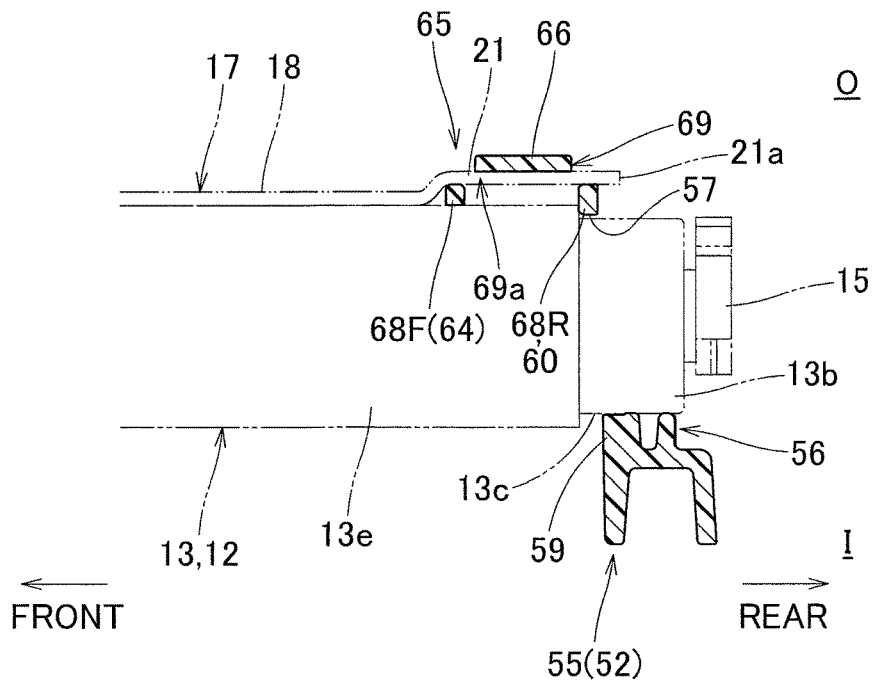
FIG. 7 is an end sectional view taken along line VII-VII of FIG. 6.

As shown in FIG. 5, the connecting region 55 protrudes towards an outboard direction O at the front end of the storage region 53. More specifically, the connecting region 55 includes a vertical wall region 56 which extends towards the outboard direction O in an upward facing fashion from the front end of the storage region 53 and a cover region 63 extending forward from the outer circumferential edge of the vertical wall region 56. As shown in FIGS. 5 and 7, the vertical wall region 56 is disposed generally along an up and down direction and is provided with an insert hole 57 for receiving the rear end 13b region of the inflator body 13. The cover region 63 covers the rear end region of the inflator body 13 partially when the case 52 is assembled with the inflator 12. Specifically, the cover region 63 covers an upper side and an outboard side of the rear end region of the inflator body 13 up to the rear end region of the main region 13e. As shown in FIGS. 5 and 6, the cover region 63 is formed to curve generally along the outer circumferential plane of the inflator body 13, and includes a recipient region 65 for receiving the insert region 21 of the mounting bracket 17.

As shown in FIGS. 5 and 7, the insert hole 57 is formed through the vertical wall region 56 in a front and rear direction so as to receive the rear end region 13c of the inflator body 13 along the axial direction of the inflator 12 (i.e. in a front and rear direction). As viewed from the axial direction of the inflator 12 (i.e. from the front and rear direction), the insert hole 57 has a round shape so as to receive the rear end region 13c of the cylindrical inflator body 13. In the illustrated embodiment, a peripheral region 58 of the vertical wall region 56, which constitutes the periphery of the insert hole 57, includes an inboard-side region 59 located at an inboard side I of the rear end region 13c and an outboard-side region 60 located at an outboard side O of the rear end region 13c. As shown in FIGS. 5 and 7, the inboard-side region 59 and outboard-side region 60 are formed in a split-level fashion and located at dislocated positions in a front and rear direction. In the illustrated embodiment, the outboard-side region 60 is formed at a farther forward position (i.e. towards the inflator 12) than the inboard-side region 59. The peripheral region 58 (i.e. the inboard-side region 59 and outboard-side region 60) forming the periphery of the insert hole 57 serves as a support region which covers an outer circumferential plane 13d of the inflator 12 (specifically, of the rear end region 13c of the inflator body 13). That is, in the illustrated embodiment, the outer circumferential plane 13d of the rear end region 13c of the inflator body 13 is covered entirely by the peripheral region 58 (i.e. the inboard-side region 59 and outboard-side region 60) which is formed to extend along the circumferential direction of the inflator 12 from vicinities of both ends of the insert region 21 in the circumferential direction of the inflator 12 (i.e. end edges 21b and 21c, which are shown in a parenthesis in FIG. 8), when the inflator 12 is viewed from a direction on the part of the rear end 13b of the inflator 12. In the illustrated embodiment, moreover, as shown in FIG. 7 (double-dotted lines) and FIG. 14, at a stepped region formed between the main region 13e and rear end region 13c of the inflator 12, the outboard-side region 60 of the peripheral region 58 abuts against the rear end plane of the main region 13e of the inflator body 13 which is inserted into the insert hole 57, thus serves as a stopper to prevent the inflator 12 from being further inserted. Further, when the inflator 12 is inserted into the insert hole 57 starting from the rear end 13b of the body 13 and assembled with the case 52, the connection port 15 of the inflator 12 is exposed, as shown in FIG. 12.

Figure 15:
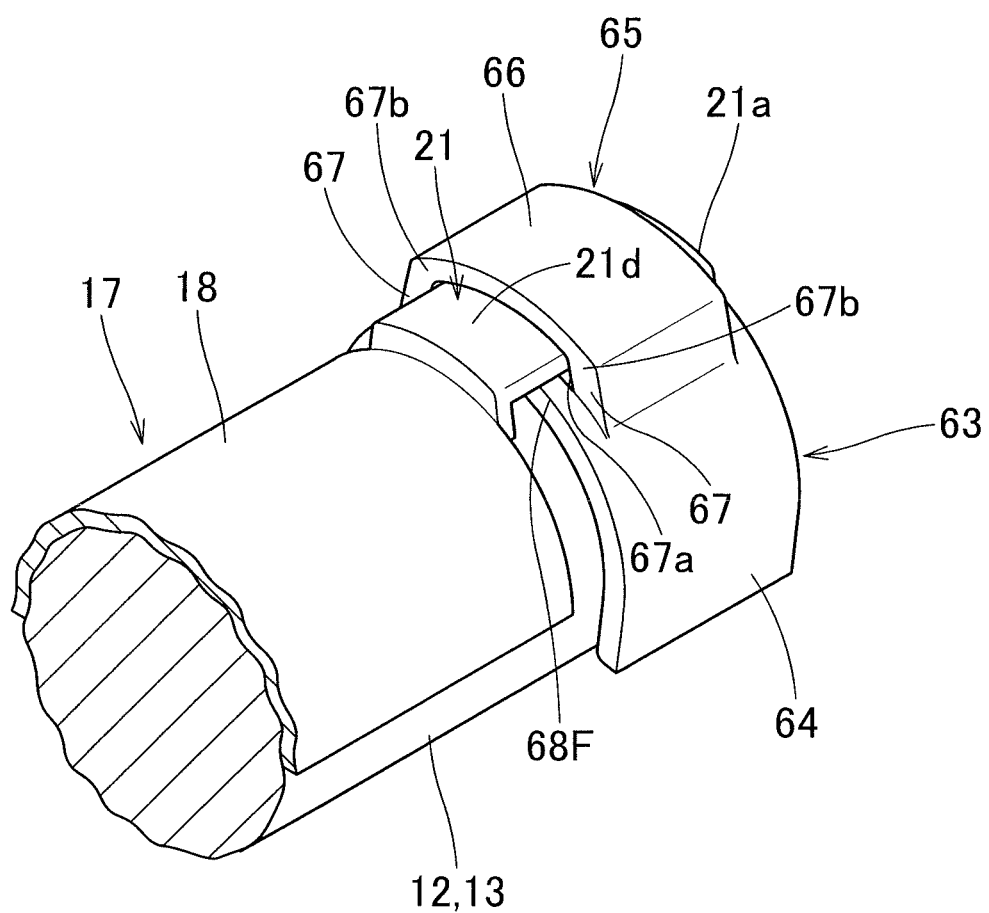
FIG. 15 is a schematic partial enlarged perspective view showing the fitting of the inflator and case.

The cover region 63 of the connecting region 55 of the case 52 includes a base region 64 and the recipient region 65 for receiving the insert region 21 of the mounting bracket 17. The recipient region 65 is disposed at an outboard side of the inflator 12 as mounted on the vehicle V. As shown in FIGS. 5 and 6, the recipient region 65 is a band-shaped region which is formed by raising a part of the cover region 63 relative to the base region 64 and slitting along a circumferential direction to form a clearance between the base region 64 and recipient region 65. Thus the recipient region 65 includes a through slot (or an assembling opening) 69 for receiving the insert region 21 and a holding region 66 which covers an outboard side of the insert region 21 inserted through the through slot 69. As shown in FIG. 6, the holding region 66 is shaped to curve along the insert region 21 so as to hold and cover the outer surface of the insert region 21 generally precisely. The holding region 66 is continuous with the base region 64 on both of the ends in the circumferential direction of the inflator 12 while forming a void space between the holding region 66 and the base region 64, which void space has an opening width wide enough to receive the insert region 21, as shown in FIG. 7. That is, as shown in FIG. 6, at both of the ends of the holding region 66 in the circumferential direction of the inflator 12, there are formed a pair of rising walls 67 which connect the holding region 66 and the base region 64. In other words, the holding region 66 connects the leading ends 67b of the rising walls 67. A connecting region 68F and a connecting region 68R are formed in front of and at the rear of the holding region 66. Each of the connecting regions 68F and 68R is continuous with the base region 64 and extends along the circumferential direction of the inflator 12, as shown in FIGS. 5, 7 and 15. In the illustrated embodiment, the rear connecting region 68R is composed of the outboard-side region 60 of the peripheral region 58 of the insert hole 57. The void space formed beneath the holding region 66 and above the connecting regions 68R and 68L has an opening width slightly greater than the thickness of the insert region 21 of the mounting bracket 57, which opening width refers to a clearance in a direction perpendicular to the axis of the inflator 12 between the connecting regions 68F and 68R and the holding region 66.

In the illustrated embodiment, a region of the recipient region 65 enclosed by the holding region 66 and rising walls 67, i.e. the void space formed between the holding region 66 and the connecting regions 68R and 68L, constitutes the through slot 69 for receiving the insert region 21. As shown in FIG. 7, the through slot 69 is formed through along the axial direction of the inflator 12 (i.e. in a front and rear direction) for receiving the insert region 21 along the axial direction of the inflator 12 (i.e. in a front and rear direction). A gap between the holding region 66 and the connecting region 68F serves as a receiving region 69a to receive the insert region 21 along the axial direction of the inflator 12 (i.e. along the front and rear direction). In the illustrated embodiment, the rising walls 67 form opposite ends of the through slot 69 in the circumferential direction of the inflator 12 and regulate the insert region 21 from moving in the circumferential direction of the inflator 12. More specifically, the inner planes of the rising walls 67 which are disposed in a periphery of the receiving region 69a form limiting planes 67a which hold the insert region 21 from moving in the circumferential direction of the inflator 21. In the illustrated embodiment, moreover, the connecting regions 68F and 68R located in front of and at the rear of the holding region 66 are disposed between the insert region 21 and inflator body 13.

Figure 13:
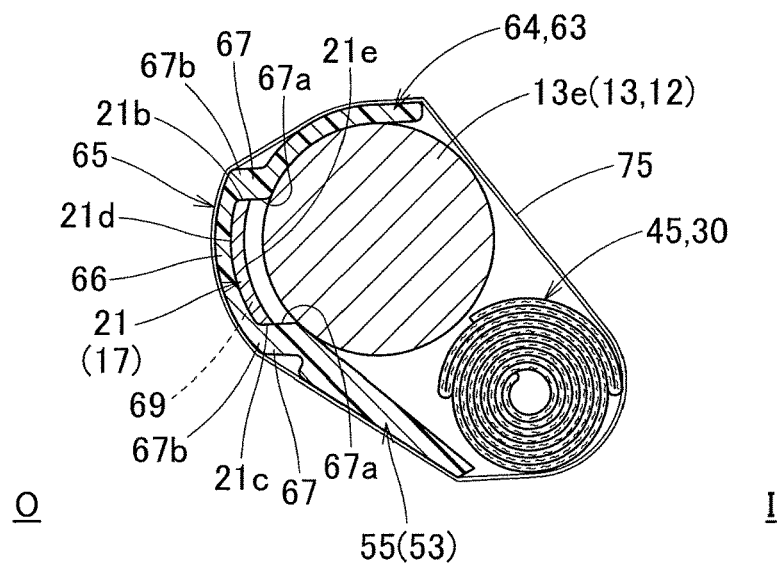
FIG. 13 is a partial enlarged vertical section showing the fitting of the inflator and case, taken along an up and down direction.

That is, as shown in FIG. 13, when the insert region 21 is inserted through the through slot 69, both of the end edges 21b and 21c of the insert region 21 in the circumferential direction of the inflator 12 abut against the limiting planes 67a of the rising walls 67. Therefore, if the insert region 21 of the mounting bracket 17 which has been assembled with the inflator 12 is inserted through the through slot 69 of the case 52, the limiting planes 67a will prevent the insert region 21 from rotating towards both directions in the circumferential direction of the inflator 12 with respect to the connecting region 55 of the case 52. In other words, the case 52 will be prevented from rotating in both directions in the circumferential direction of the inflator 12 (or folded-up body 45) with respect to the inflator 12, or prevented from twisting with respect to the inflator 12, and accordingly, the folded-up body 45 stored in the case 52 will also be prevented from twisting or rotating in both directions in the circumferential direction of the inflator 12. Further, as shown in FIG. 14, the insert region 21 of the illustrated embodiment is covered by the holding region 66 on the outer side in a direction perpendicular to the axis of the inflator 12 (i.e. on the outer circumferential plane 21d) and is supported by the connecting regions 68F and 68R on the inner side in the direction perpendicular to the axis of the inflator 12 (i.e. on the inner circumferential plane 21e). That is, when the insert region 21 is set in the through slot 69, both of the end edges 21b and 21c of the insert region 21 in the circumferential direction of the inflator 12 and the both surfaces (i.e. the outer circumferential plane 21d and inner circumferential plane 21e) of the insert region 21 in the direction perpendicular to the axis of the inflator 12 are held from moving by regions forming the inner circumferential plane of the through slot 69 (i.e. by the rising walls 67, holding region 66 and connecting regions 68F and 68R).

The folded-up body 45 is stored in the case 52 with the mounting tabs 38 protruded out of the openings 53a of the storage region 53 as shown in FIG. 12 and kept in place with the aid of the breakable wrapping member 75 which is mounted around the storage region 53 at intervals, as shown in FIGS. 12 and 13.

Mounting of the head-protecting airbag device M1 on the vehicle V is now described. Firstly, the airbag 30 is folded up from a flatted state in which the inboard side wall 31a and outboard side wall 31b overlap each other, as shown in (B) of FIG. 10. In the illustrated embodiment, the region in a vicinity of the upper edge 30a of the airbag 30 is folded in a bellows fashion on creases extending generally in parallel to the upper edge 30a while the lower region is rolled on the outboard side wall 31b starting from the lower edge 30b. Thus the folded-up body 45 is formed. Then the breakable wrapping members 75 are wrapped around the folded-up body 45 at intervals for keeping the folded-up configuration, as shown in (B) of FIG. 10. Then the mounting brackets 26 are attached to the mounting tabs 38 protruding out of the folded-up body 45. The mounting bracket 17 is mounted on the inflator 12 and the inflator 12 is connected with the inlet region 33 of the airbag 30 with the aid of the clamp 23, as shown in FIG. 11. Thereafter, the folded-up body 45 is stored in the cases 50 and 52, and the wrapping members 75 are wrapped around the cases 50 and 52 holding the folded-up body 45. Then the inflator 12 and the case 52 are assembled together by moving the inflator 12 rearward along the axial direction such that the rear end region 13c of the inflator body 13 is inserted through the insert hole 57 of the connecting region 55 of the case 52 while the insert region 21 of the mounting bracket 17 is inserted through the through slot 69 from the receiving region 69a. Thus an airbag module AM1 is provided as shown in FIG. 12.

Subsequently, the mounting brackets 17 and 26 are located at predetermined positions on the inner panel 2 and fixed thereto with the bolts 24 and 27. Then not-shown lead wires extending from a suitable control for actuating the inflator is connected to the connection port 15 of the inflator 12. If then the front pillar garnish 5, the roof head liner 6 and the pillar garnishes 7 and 8 are mounted on the inner panel 2, the head-protecting airbag device M1 is mounted on the vehicle V.

After the airbag device M1 is mounted on the vehicle V, when the inflator 12 is actuated in response to an actuating signal fed from the control, an inflation gas is discharged from the inflator 12 and flows into the airbag 30, and the airbag 30 then pushes and opens the airbag cover 10 and is deployed downward and covers inboard sides of the windows W1, W2, the middle pillar CP, and the rear pillar RP, as indicated with double-dotted lines in FIG. 1.

With the head-protecting airbag device M1 of the foregoing embodiment, the inflator 12, which has been coupled with the folded-up body 45 and held by the mounting bracket 17, and the case 52 mounted on the folded-up body 45 can be assembled together in a simple fashion by moving the insert region 21 of the mounting bracket 17 along the axial direction of the inflator 12, i.e. along the axial direction of the folded-up body 45, and inserting it into the through slot (assembling opening) 69 of the case 52 from the receiving region 69*a*. That is, the inflator 12 and the case 52 can be assembled together easily without using a band or the like which is used in a conventional head-protecting airbag device. Further, the insertion of the insert region 21 into the through slot 69 is easy because the insert region 21 has only to be moved along the axial direction of the inflator 12 (or folded-up body 45). In the airbag device M1, the insert region 21 mated with the through slot 69 is held from rotating around the inflator 12 by the limiting planes 67*a* of the through slot 69, thus helps suppress the folded-up body 45 from rotating in the circumferential direction. That is, the configuration that the insert region 21 fits the through slot 69 prevents the case 52 from moving in a twisting fashion with respect to the insert region 21, i.e. with respect to the inflator 12 coupled with the mounting bracket 17. As a result, the folded-up body 45 stored in the case 52 will also be prevented from twisting with respect to the inflator 12, and a torsion in a region of the folded-up body 45 located immediately beneath the inflator 12 will also be prevented.

Therefore, the head-protecting airbag device M1 of the foregoing embodiment has an easy assembling structure between the inflator 12 and the case 52 and is capable of suppressing a torsion in the folded-up body 45 from occurring when mounted on the upper peripheries of the windows W1 and W2.

In the head-protecting airbag device M1 of the foregoing embodiment, the case 52 includes the support region that covers the outer circumferential plane of the inflator 12. This support region is configured to extend generally along the circumferential direction of the inflator 12 from one end of the insert region 21 of the mounting bracket 17 in the circumferential direction of the inflator, when the inflator 12 is viewed from a direction on the part of the rear end 13*b*. More specifically, in the illustrated embodiment, the connecting region 55 of the case 52 includes the insert hole 57 for receiving the rear end 13*b* region of the inflator 12, and the peripheral region 58 of the insert hole 57 constitutes the support region that extends generally along the circumferential direction of the inflator 12 from both ends of the insert region 21 in the circumferential direction of the inflator. That is, as shown in FIG. 12, the inflator 12 of the foregoing embodiment is inserted through the insert hole 57 in such a manner as to expose the connection port 15 located at the rear end 13*b*. This configuration will facilitate the connection work to connect a connector with not-shown lead wires for feeding an actuating signal to the connection port 15 when the airbag module AM1, in which the inflator 12, the folded-up body 45 and cases 50 and 52 are assembled together, is mounted on the upper peripheries of the windows W1 and W2 of the vehicle V. If such an advantageous effect does not have to be considered, the case may be formed without a support region for covering an outer circumferential plane of the inflator 12. Alternatively, the support region may be configured to cover a region in a vicinity of the rear end (second end) of the inflator.

In the head-protecting airbag device M1 of the foregoing embodiment, moreover, the support region of the case (i.e. the peripheral region 58 of the insert hole 57) covers the outer circumferential plane of the inflator 12 all over, as shown in FIGS. 12 and 14. That is, the support region extends generally along the circumferential direction of the inflator 12 from both of the ends (i.e. end edges 21*b* and 21*c*) of the insert region 21 in the circumferential direction of the inflator, when the inflator 12 is viewed from a direction on the part of the rear end 13*b*, thus supports the outer circumference of the inflator 12 (i.e. the outer circumference 13*d* of the rear end region 13*c*). This configuration will help suppress the inflator 12 from moving with respect to the case 52 in a direction orthogonal to the axis, and in other words, suppress the case 52 from twisting in a clockwise direction or a counterclockwise direction about the axis of the inflator 12, or twisting in both directions in the circumferential direction of the inflator 12 with respect to the inflator. Further, in the airbag device M1 of the foregoing embodiment, the case 52 is held from moving with respect to the inflator 12 at two remote positions in a direction orthogonal to the axis of the inflator, i.e. on the inflator 12 itself and at the insert region 21 located at a distance from the inflator 12. This configuration will further steadily suppress a twisting movement of the case 52 with respect to the inflator 12, thus further adequately suppress a twisting of the region of the folded-up body 45 disposed immediately below the inflator 12. If such an advantageous effect does not have to be considered, the support region may be configured to extend from only one of the opposite ends of the insert region in the circumferential direction of the inflator.

In the foregoing embodiment, especially, the insert hole 57 for receiving the rear end 13*b* region of the inflator 12 along the axial direction of the inflator 12 is formed in the case 52 and the peripheral region 58 of the insert hole 57 constitutes the support region. With this configuration, the insert region 21 of the mounting bracket 17 can be inserted through the through slot 69 at the same time as the rear end 13*b* region of the inflator 12 is inserted into the insert hole 57, which will further facilitate the assembling of the inflator 12 and the case 52.

In the airbag device M1 of the foregoing embodiment, the case 52 includes the through slot (or assembling opening) 69 for receiving the insert region 21, and the through slot 69 is composed of a region enclosed by the rising walls 67 each of which includes the limiting plane 67*a* and the holding region 66 which are so formed as to connect the leading ends 67*b* of the rising walls 67. The holding region 66 is configured to hold an outer surface (or an outboard side) of the insert region 21. This configuration will further facilitate the mating work of the insert region 21 and the through slot (assembling opening) 69 because the insert region 21 easily fits in the through slot 69 such that the outer circumference (the end edges 21*b* and 21*c*, the outer circumferential plane 21*d* and inner circumferential plane 21*e*) is covered with the periphery of the through slot 69 (the rising walls 67, the holding region 66 and the connecting regions 68F and 68R) merely by moving the insert region 21 along the axial direction of the inflator 12 and inserting it into the through slot 69.

In the illustrated embodiment, more specifically, the limiting planes 67*a* of the through slot 69 hold the both ends of the insert region 21 in the circumferential direction of the inflator 12 (i.e., the end edges 21*b* and 21*c*) and the holding plane 66 and connecting regions 68F and 68R abut against the both planes of the insert region 21 in the direction orthogonal to the axis of the inflator 12 (the outer circumferential plane 21*d* and inner circumferential plane 21*e*). That is, the insert region 21 is supported by the rising walls 67, the holding region 66 and connecting regions 68F and 68R all over. Moreover, the outer circumferential plane 13*d* of the inflator 12 is also covered by the peripheral region 58 of the insert hole 57 all over. That is, the insert region 21, which is disposed at a distance from the inflator 12 in a direction orthogonal to the axis of the inflator 12, is held from moving in both directions in the circumferential direction of the inflator 12 and held from moving in both directions in the direction orthogonal to the axis of the inflator 12, i.e., the insert region 21 is held from moving in four directions, when fitting in the through slot 69. Further, the inflator 12 inserted into the insert hole 57 is held from moving in the direction orthogonal to the axis of the inflator 12. Therefore, the insert region 21 inserted into the through slot 69 and the inflator 12 itself fix the case 52 in a robust fashion and prevents a torsion in the folded-up body 45.

An alternative embodiment of the invention is now described referring to FIG. 16. A case 52A includes an assembling opening 69A which is of a U-shaped section opening outwardly in a direction orthogonal to the axis of the inflator 12, and a retaining projection 77 which penetrates an insert region 21A and retains the insert region 21A. More specifically, in order to receive the insert region 21A from the front along an axial direction of the inflator 12, the assembling opening 69A opens towards front and rear directions and towards the direction orthogonal to the axis of the inflator 12, and is provided with a pair of rising walls 67A which covers opposite sides of the insert region 21A in a circumferential direction of the inflator 12. In the assembling opening 69A, as shown in FIG. 16, a region enclosed by the front end regions of the rising walls 67A serves as an inlet opening 69a for receiving the insert region 21A. The insert region 21A extends from a support region 18A of a mounting bracket 17A, and is provided with a narrow recessed section 21f which is open at the rear end and receives the retaining projection 77 of the case 52A. The retaining projection 77 includes, at the leading end (i.e. at the leading end in a direction orthogonal to the axis of the inflator 12), a pair of hooks 77a which protrude in the circumferential direction of the inflator 12 so as to be engageable with the periphery of the recessed section 21f. With this configuration, the limiting planes 67a of the rising walls 67A, which constitute the periphery of the assembling opening 69A, hold the insert region 21A from moving in both directions in the circumferential direction of the inflator 12, and the hooks 77a of the retaining projection 77 suppress the insert region 21A from moving in the direction orthogonal to the axis of the inflator 12.

Figure 17:
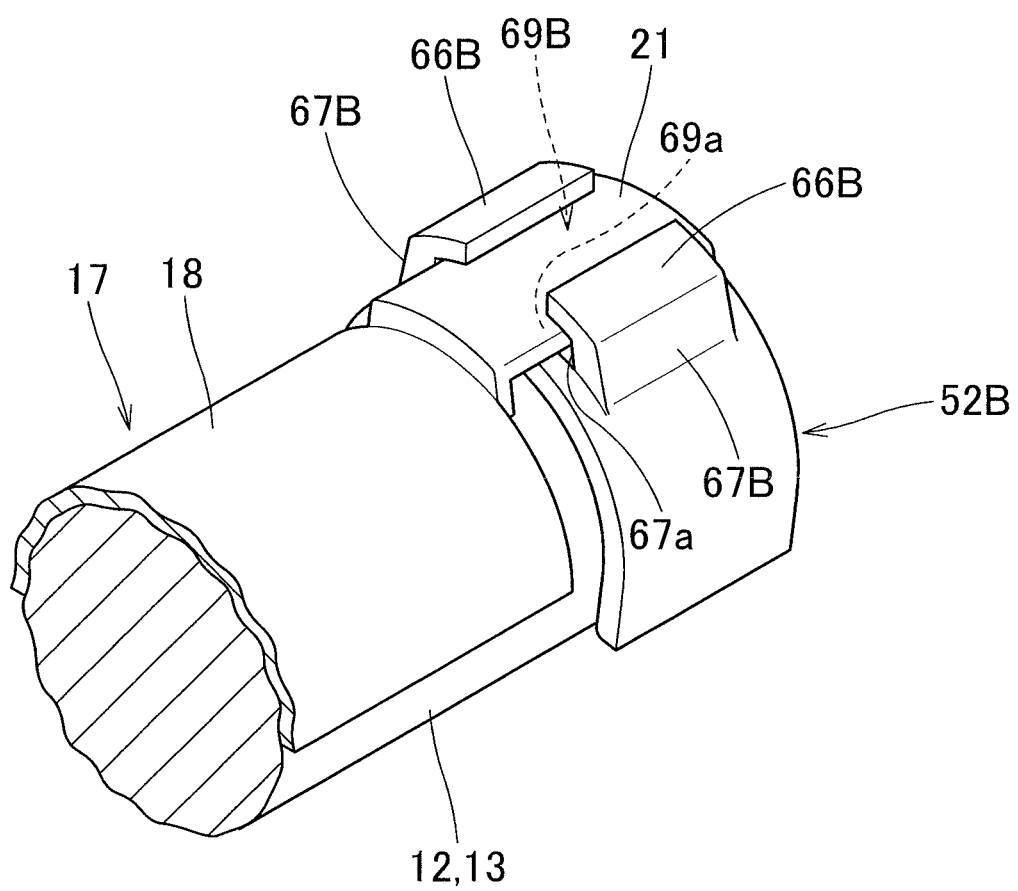
FIG. 17 is a schematic partial enlarged perspective view showing a fitting of an inflator and a case in another alternative embodiment.
Figure 18:
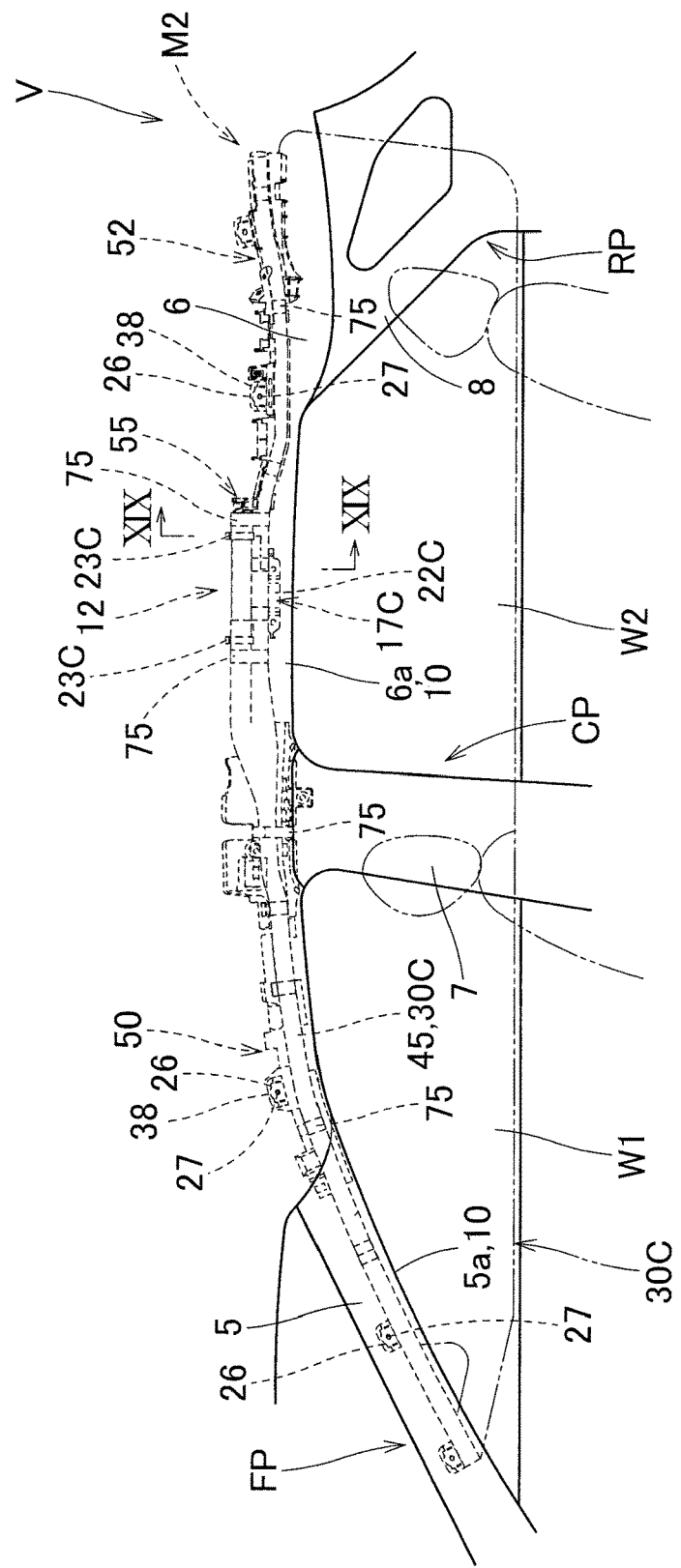
FIG. 18 is a schematic front elevation of a head-protecting airbag device according to another embodiment of the invention as viewed from a vehicle interior.
Figure 19:
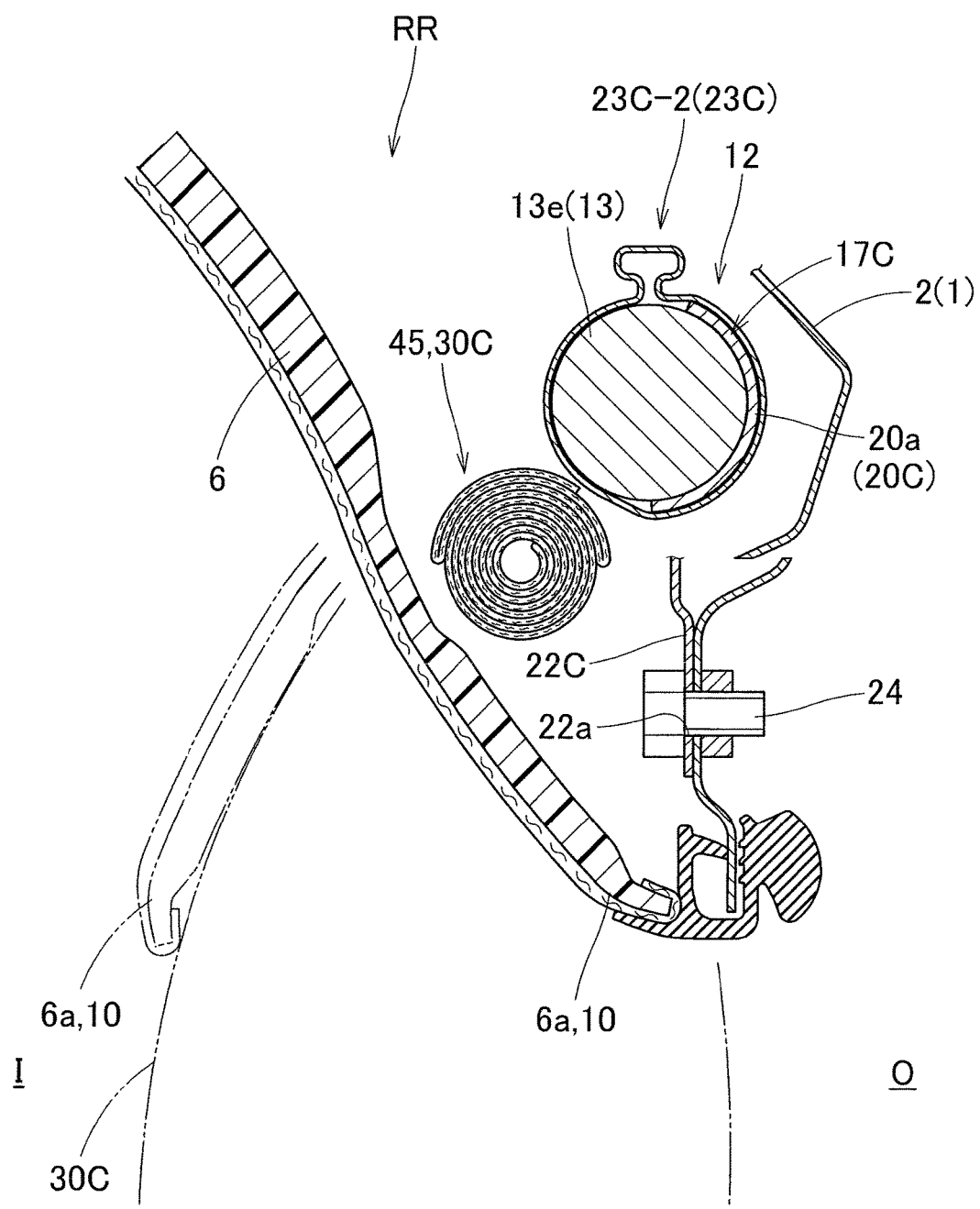
FIG. 19 is a vertical sectional view of the airbag device of FIG. 18 as mounted on board, taken along line XIX-XIX.
Figure 20:
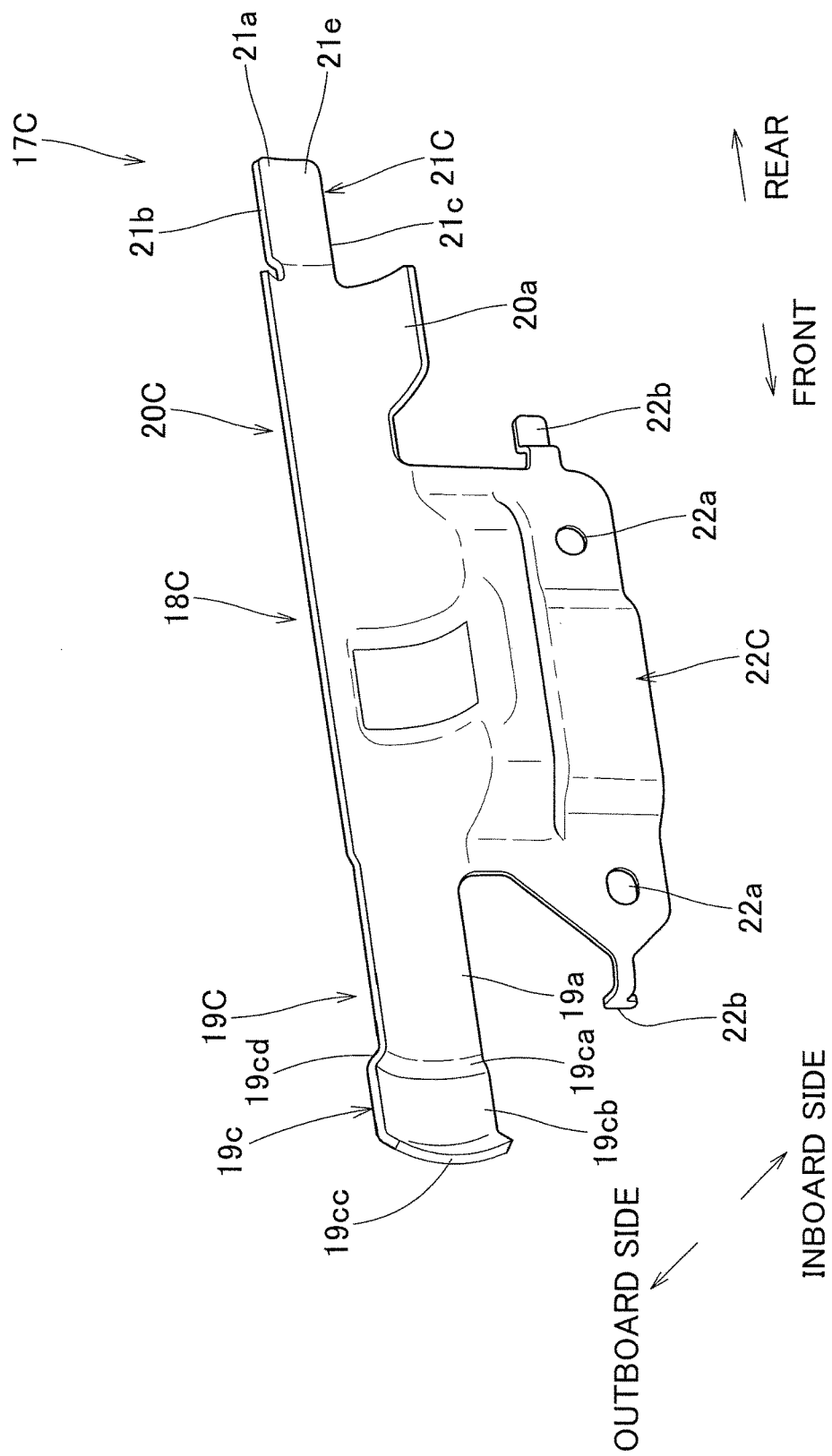
FIG. 20 is a schematic perspective view of a mounting bracket used in the airbag device of FIG. 18.

In the case 52 of the foregoing embodiment, the holding region 66 connects the leading ends 67b of the rising walls 67 and covers the outer side of the insert region 21 in the direction orthogonal to the axis of the inflator 12 (i.e., the outer surface of the insert region 21) all over. However, the shape of the holding section should not be limited thereby. By way of example, the holding section may be configured like a holding section 66B of a case 52B depicted in FIG. 17. The holding section 66B is formed to extend from the leading ends 67b of both of the rising walls 67 in such a manner as to hang over the insert region 21 and form a gap between the leading ends thereof, such that the holding section 66B covers the outer surface of the insert region 21 partially. Further, the holding region may also be formed only on one of the rising walls, although not shown in the drawings.

In the head-protecting airbag devices of the foregoing embodiments, the inflator has the gas discharge region at the front end and the case assembled with the inflator extends rearward from the rear end of the inflator. However, the invention may be applied to a head-protecting airbag device in which an inflator has a gas discharge region at the rear end and a case assembled with the inflator extends forward from the front end of the inflator.

A head-protecting airbag device M2 according to a further alternative embodiment is now described. In the airbag device M2, the fastening configuration of an inflator 12 and an airbag 30C against a mounting bracket 17C is slightly different from the foregoing embodiments. As shown in FIGS. 18, 19, 27 and 28, the airbag device M2 has a generally similar configuration to the airbag device M1 described above except in the mounting bracket 17C and airbag 30C. Therefore, detailed descriptions of common members will be omitted, and the common members will be given common reference numerals.

As shown in FIGS. 20 to 24, the mounting bracket 17C has a generally similar structure to the mounting bracket 17 of the foregoing embodiment except in contour of a later-described retaining region (support region) 18C. Therefore, detailed descriptions of common regions will be omitted, and the common regions will be given common reference numerals followed by "C".

The retaining region (support region) 18C is a region to cover the outer circumference of the body 13 of the inflator 12 when coupled with the inflator 12, similarly to the support region 18 of the foregoing embodiment. The mounting bracket 17C is assembled with the inflator 12 with a clamp 23C of sheet metal which is mounted around the inflator body 13 and the retaining region 18C. More specifically, a total of two clamps 23C are used in this specific embodiment. As indicated by double-dotted lines in FIG. 21, one each of the clamps 23C is used at a front end region 19C of the retaining region 18C which is located farther forward than the mounting region 22C, and at a rear end region 20C of the retaining region 18C which is located farther rearward than the mounting region 22C. In this specific embodiment, the two clamps 23C are the same clamps, and the clamp 23C used at the front or first fastened region 19a will be referred to as a first clamping member 23C-1, while the clamp 23C used at the rear or second fastened region 20a will be referred to as a second clamping member 23C-2.

Figure 21:
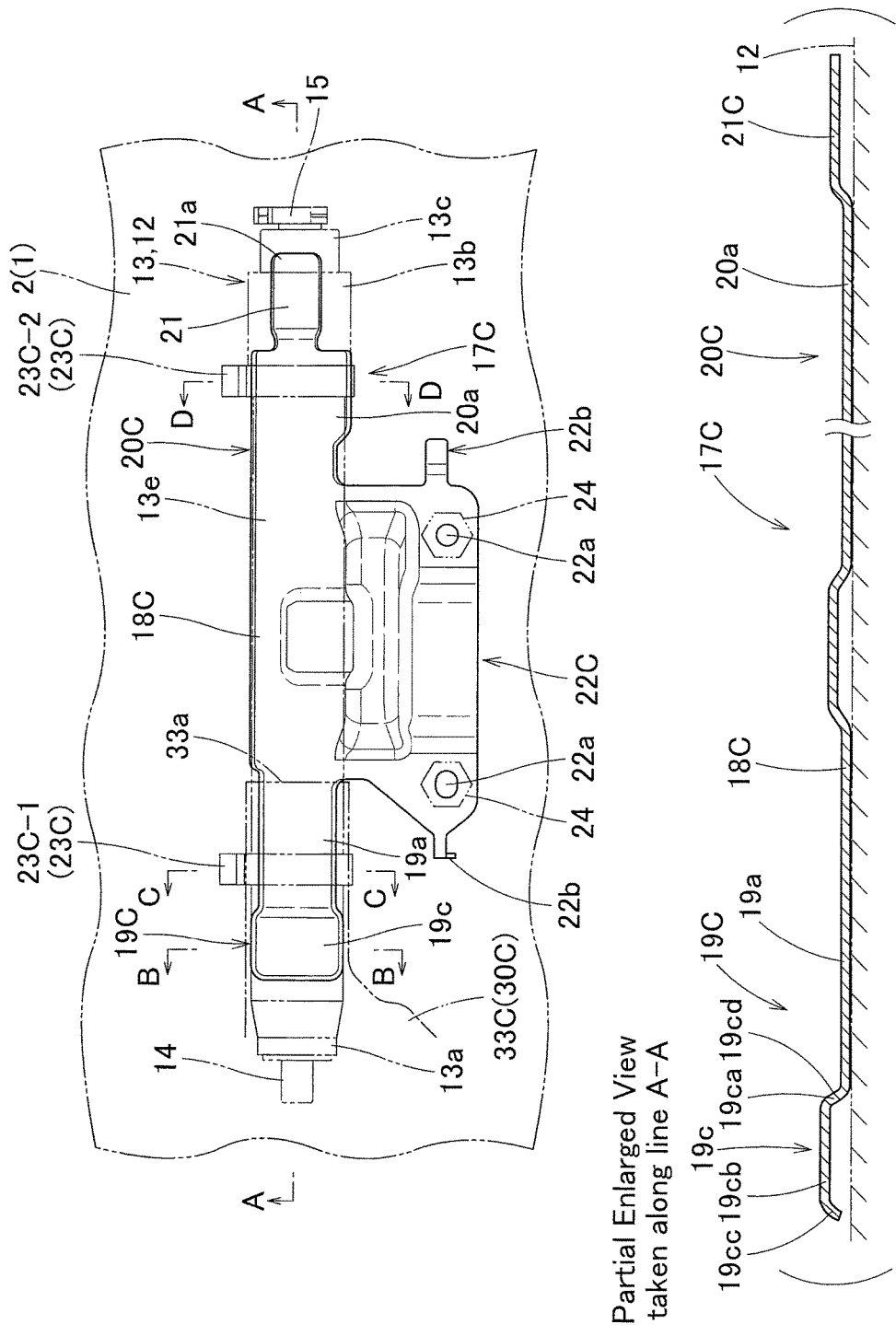
FIG. 21 shows a front elevation of the mounting bracket of FIG. 20 and a sectional view taken along line A-A.
Figure 23:
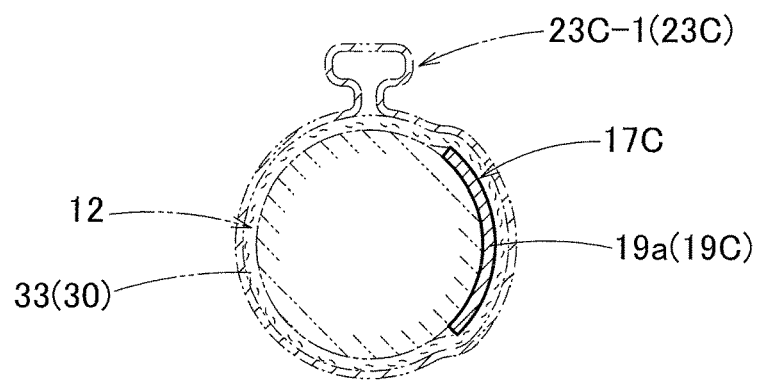
FIG. 23 is a sectional view taken along line C-C of FIG. 21.

The front end region 19C of the retaining region 18C is a region to be inserted into the inlet region 33C of the airbag 30C together with the inflator 12. Accordingly, the clamp 23C-1 used at the front end region 19C is located outside of the inlet region 33C of the airbag 30C to couple the inlet region 33C and the inflator 12 as well as couple the inflator 12 and the mounting bracket 17C, as shown in FIG. 23. Similarly to the foregoing embodiment, a root region (or a rear region), which is disposed towards the mounting region 22C, of the front end region 19C serves as a first fastened region 19a wound by the clamp 23C-1 as shown in FIG. 21. A leading end (or front end) region of the front end region 19C serves as a protruding region 19c. The first fastened region 19a and protruding region 19c constitute a bag-connecting region that helps connect the inlet region 33C of the airbag 30C and the inflator 12.

As shown in a parenthesis of FIG. 21, the protruding region 19c includes an enlarging region 19ca which is disposed farther outside than, or more particularly, radially enlarged in comparison with, the fastened region 19a, a circumferential wall region 19cb which extends continuously from the enlarging region 19ca along the axial direction of the inflator 12 and a contracted region 19cc which is formed on the opposite end of the circumferential wall 19cb to the enlarging region 19ca. The plane of the enlarging region 19ca facing towards the fastened region 19a forms a step plane 19cd which rises outwardly from the fastened region 19a. The step plane 19cd helps hold the clamp 23C-1 mounted around the fastened region 19a in place.

Figure 22:
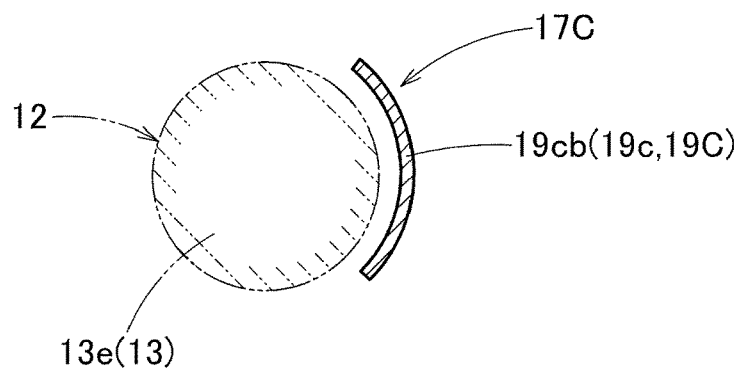
FIG. 22 is a sectional view taken along line B-B of FIG. 21.

As seen in a cross-sectional shape shown in FIG. 22, the circumferential wall region 19cb is shaped to the outer circumference of the inflator 12 at such a radial height that a uniform gap is formed between the circumferential wall region 19cb and the outer circumference of the inflator 12. The circumferential wall region 19cb is formed into a partial arc face, like a generally half-pipe shape. As seen in the parenthesis of FIG. 21, the circumferential wall region 19cb extends for a predetermined length in the axial direction at the uniform radial height. The rigidity of the protruding region 19c is enhanced by forming the circumferential wall region 19cb in such a manner as to extend continuously from the enlarging region 19ca in the axial direction of the inflator 12. The contracted region 19cc is bent radially inward (i.e., towards the inflator) at an end in an axial direction of the circumferential wall region 19cb (i.e., at the leading end of the circumferential wall region 19cb). If an end plane of the circumferential wall region 19cb is bent towards the inflator 12 this way, the protruding region 19cd will be inserted into the airbag 30C smoothly without getting stuck.

Figure 24:
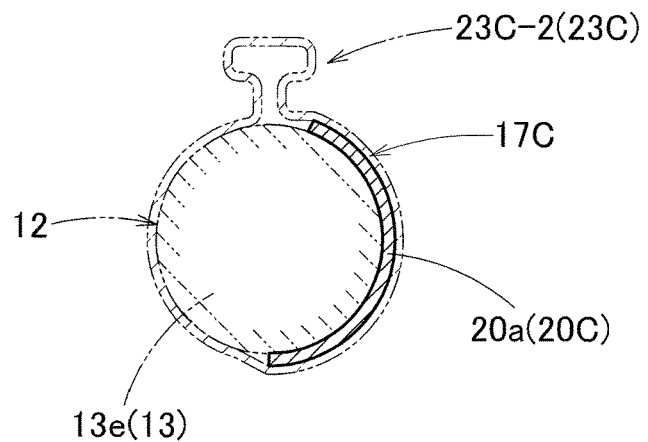
FIG. 24 is a sectional view taken along line D-D of FIG. 21.

In the rear end region 20C of the mounting bracket 17C, a rear end area of the rear end region 20C located away from the mounting region 22C serves as a second fastened region 20a which is fastened by the clamp 23C (23C-2), as shown in FIG. 21. The second fastened region 20a is greater in width than other region (i.e. the front area) of the rear end region 20. Unlike in the front or first fastened region 19a, the airbag 30C is not disposed on the rear or second fastened region 20a, and the clamp 23 is used only to clamp the inflator 12 and mounting bracket 17C, as shown in FIG. 24. That is, the condition for obtaining a predetermined tightening force in tightening a clamp in the rear (second) fastened region 20a is different from that in the front (first) fastened region 19a. To compensate the less volume of the object of tightening due to absence of the airbag 30C, as shown in FIGS. 23 and 24, the rear fastened region 20a has a longer length in a circumferential direction than the front fastened region 19a.

Figure 26A:
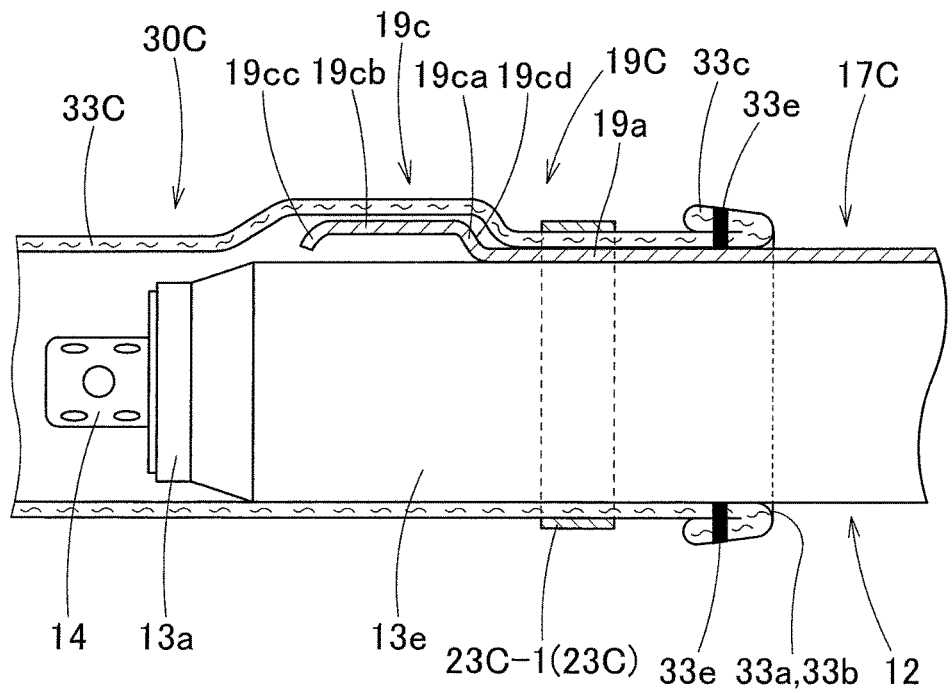
FIGS. 26A and 26B illustrate the way the airbag and the mounting bracket of FIG. 20 are clamped together.

In the head-protecting airbag device M2, the inlet region 33C has the opening 33b for connection with the inflator 12 in a vicinity of the rear end 33a. As shown in FIG. 26A, in the rear end 33a, the cloth member forming the inlet region 33C is folded back outwardly, and the doubled cloth member is integrated by thermal fusion bonding at the bonded region 33e. Thus a thickened region 33c is formed in the periphery of the opening 33b. The airbag 30C has a similar configuration to the airbag 30 of the foregoing embodiment except the inlet region 33C, and therefore, detailed descriptions of common regions will be omitted.

Figure 25:
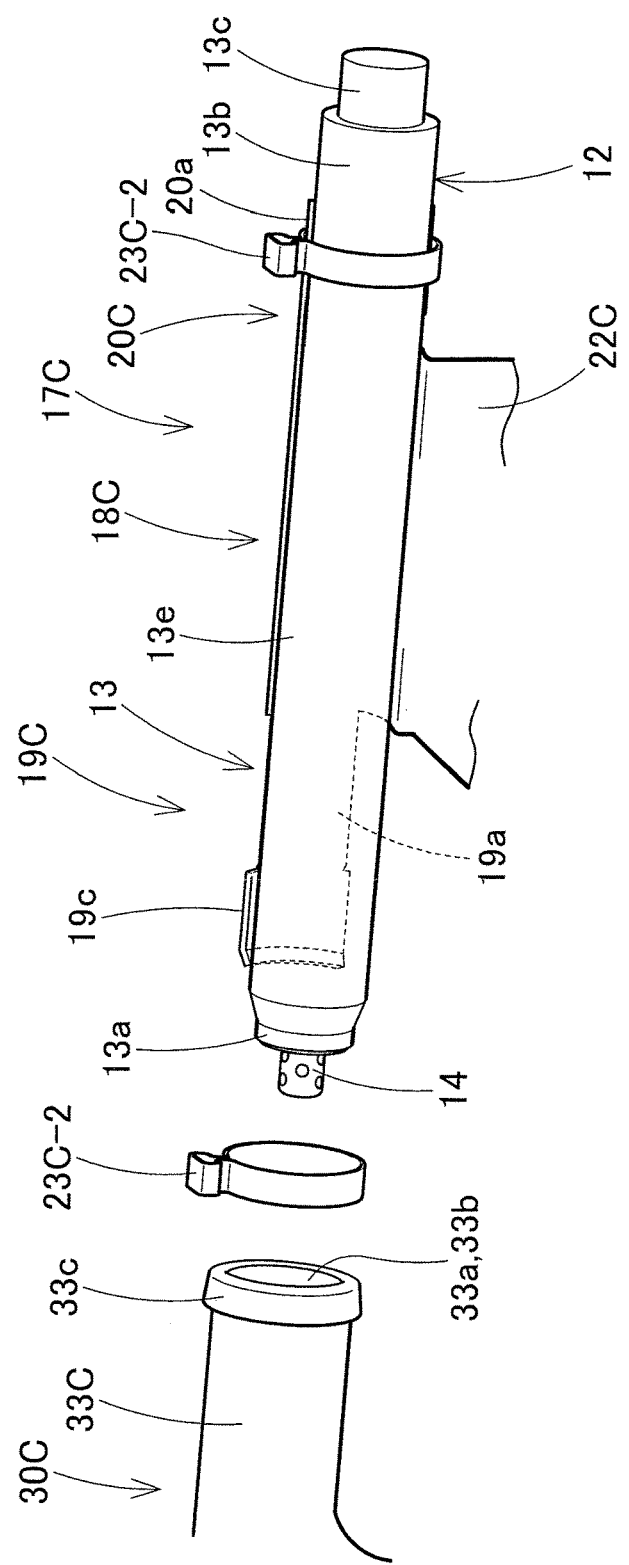
FIG. 25 illustrates the way an airbag and an inflator are mounted on the mounting bracket of FIG. 20.

The head-protecting airbag device M2 is mounted on a vehicle in a similar fashion to the foregoing embodiment. Firstly, the airbag 30C is folded up into a folded-up body 45, and the inflator 12 is connected to the inlet region 33C of the folded-up body 45. Then the folded-up body 45 is stored in the cases 50 and 52 to form an airbag module AM2. Specifically, when the inlet region 33C and inflator 12 are connected, as shown in FIG. 25, the retaining region 18C of the mounting bracket 17C is disposed on the inflator body 13, and then the clamp 23C-2 is fastened around the inflator 12 (body 13) and the mounting bracket 17C at the rear fastened region 20a. The front end region of the inflator 12 is inserted into the inlet region 33C of the airbag 30C via the opening 33b together with the front end region 19C of the mounting bracket 17C, and the clamp 23C-1 is fastened on the outer circumference of the airbag 30C (inlet region 33C) at the front fastened region 19a of the mounting bracket 17C. The order of fastening the clamps 23C-1 and 23C-2 is changeable.

Figure 26B:
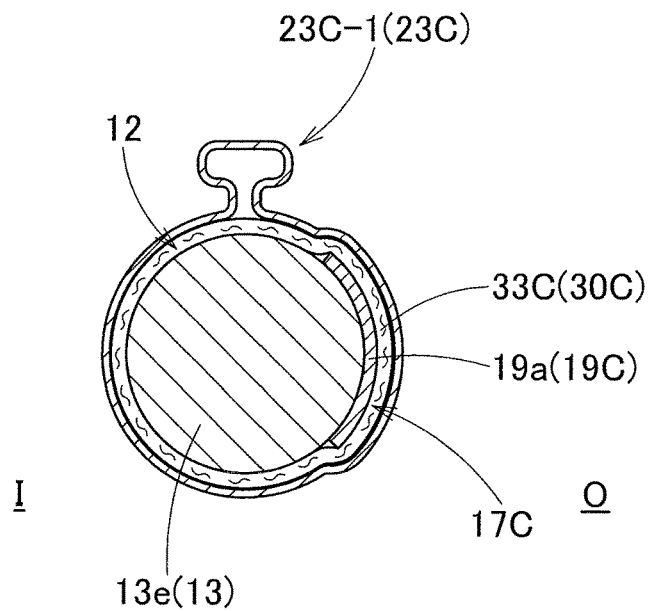
Figure 27:
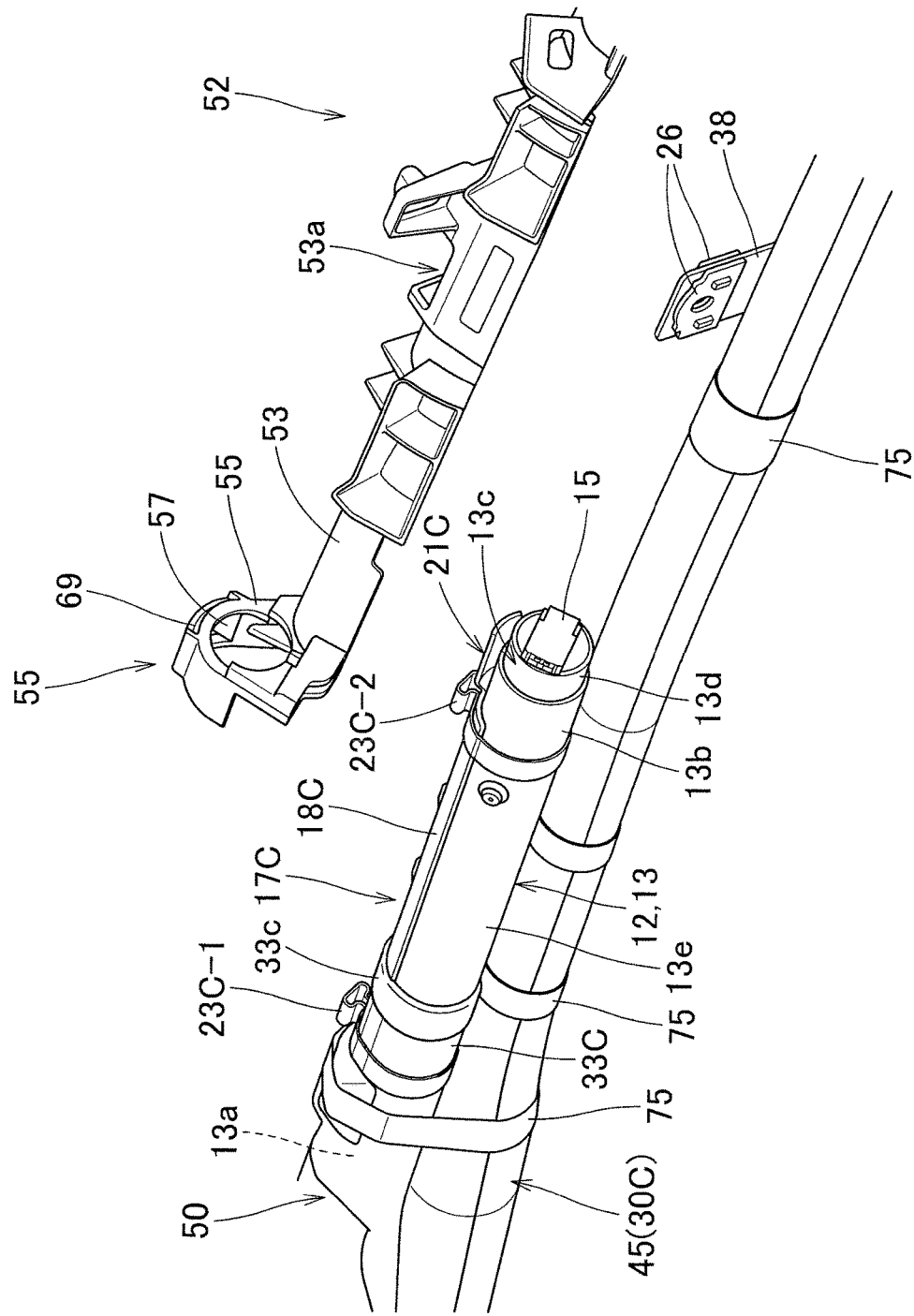
FIG. 27 shows a folded-up body formed by folding the airbag and a case laid side by side in the another embodiment, by schematic partial enlarged perspective view.

FIGS. 26A and 26B depict the way the airbag 30C and inflator 12 are fastened to the mounting bracket 17C at the front or first fastened region 19a. The inner circumferential plane of the fastened region 19a abuts against the outer circumference of the inflator 12, and the clamp 23C (23C-2) is tightened around the inlet region 33C of the airbag 30C disposed on the outer circumference of the fastened region 19a.

In the head-protecting airbag device M2, as best shown in FIGS. 26A and 26B, the mounting bracket 17C includes the first fastened region 19a which is in contact with the outer circumference of the inflator 12 on the inner circumferential plane and is wound by the clamp 23C-1 on the outer circumference, and the protruding region 19c which includes the step plane 19cd that rises outwardly from the fastened region 19a. The protruding region 19c and fastened region 19a of the mounting bracket 17C and a region of the inflator 12 in a vicinity of the gas discharge region 14 are inserted into the inlet region 33C of the airbag 30C, and clamping by the clamp 23C-1 is done in that state.

Figure 29A:
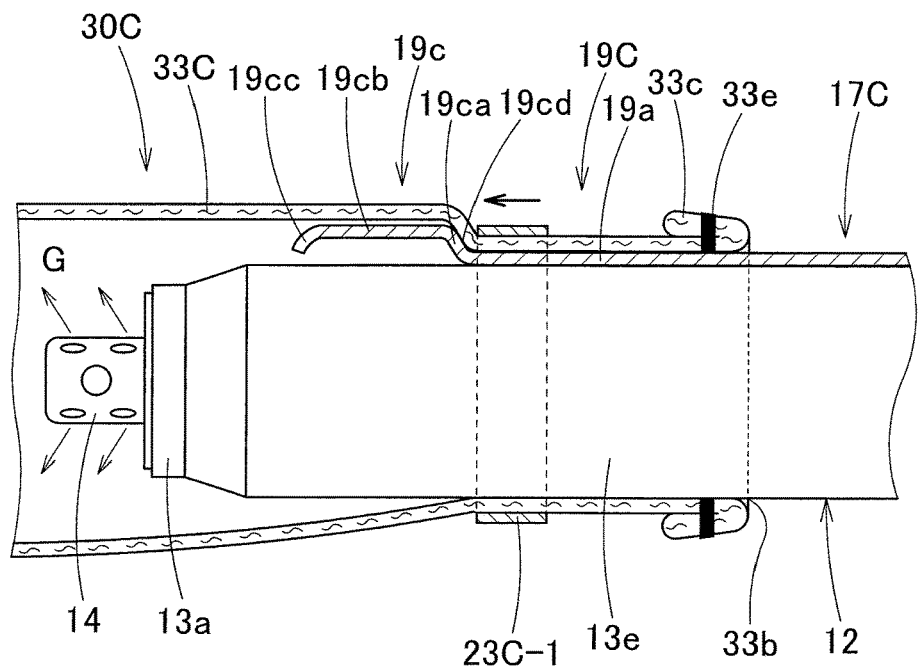
FIGS. 29A and 29B illustrate behaviors of the head-protecting airbag device of the another embodiment.

As shown in FIG. 29A, in the airbag device M2, the protruding region 19C is disposed farther towards a discharge direction of the inflation gas G than the fastened region 19a around which the clamp 23C-1 is mounted. When the inflation gas G is produced, a gas pressure may enlarge the inlet region 33C of the airbag 30C as well as the clamp 23C-1, and a tightening force of the clamp 23C-1 may be lowered. However, with the above configuration, the protruding region 19c (more precisely, the step plane 19cd) will prevent the clamp 23C-1 from moving towards the discharge direction of the inflation gas G (towards the left in FIG. 29A) and help retain the inlet region 33C of the airbag 30C between step plane 19cd and the clamp 23C-1. Therefore, decoupling of the inlet region 33C from the inflator 12 is adequately prevented. That is, the configuration of the airbag device M2 will provide a secure coupling of the inflator 12 and the inlet region 33C of the airbag 30C through the use of the clamp 23C-1, without any special treatment on the outer circumference of the inflator 12 and without a fear of decoupling of the inflator 12 and inlet region 33C.

Moreover, in the head-protecting airbag device M2, the protruding region 19c of the mounting bracket 17C is formed only partially in the circumferential direction of the inflator 12, not over an entire circumference of the inflator 12. This configuration will facilitate an inserting work of the inflator 12 together with the protruding region 19c of the mounting bracket 17C into the inlet region 33C of the airbag 30C, in comparison with an instance where the protruding region is formed over an entire circumference of the inflator. Moreover, since the protruding region 19c is formed at the leading end (or front end) of the mounting bracket 17C, a loss of material will be suppressed and a decoupling of the inflator 12 and inlet region 33C of the airbag 30C will be adequately prevented.

Figure 29B:
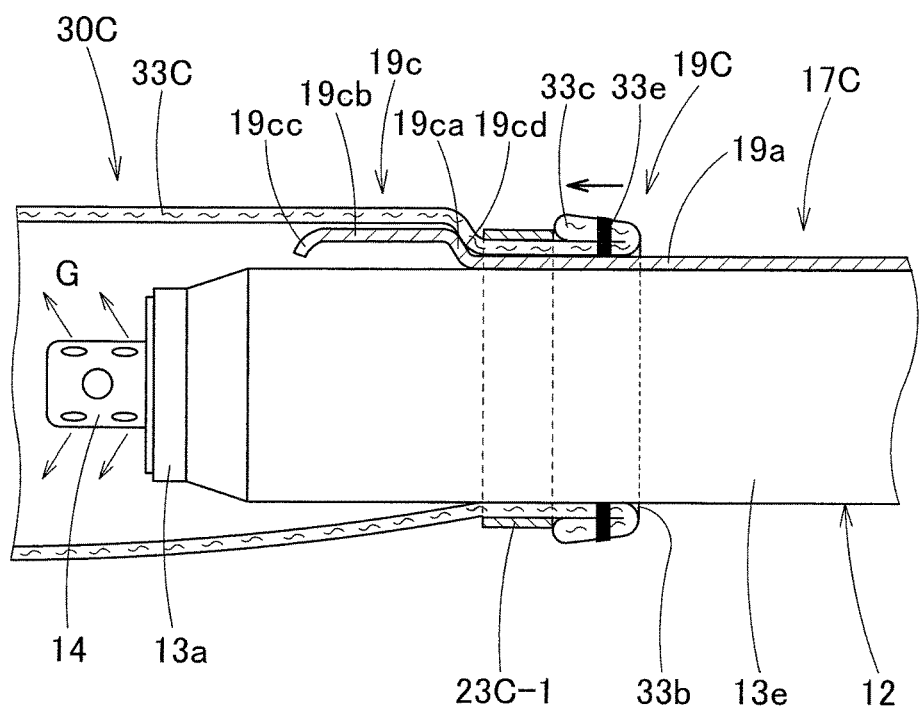

Furthermore, in the head-protecting airbag device M2, as shown in FIG. 29B, the inlet region 33C of the airbag 30C is provided, at the hem of the opening 33B, with the thickened region 33c which is formed by doubling the cloth member forming the inlet region 33C and integrating the doubled cloth member. Such a thickened region 33c will bump against the clamp 23C-1 and prevent the airbag 30C from moving in a direction to be decoupled from the inflator 12 even in the event that the gas pressure of the inflation gas G acts on the airbag 30C towards the left in FIG. 29b.

In the airbag device M2, furthermore, the protruding region 19c of the mounting bracket 17C includes the enlarging region 19ca and the circumferential wall region 19cb that extends further from the enlarging region 19ca along the axial direction of the inflator 12. With this configuration, the protruding region 19c has an enhanced rigidity in comparison with an instance where a retaining step used to prevent a decoupling of the airbag from the inflator is formed merely by bending and raising an end region of the fastened region outwardly. Moreover, since the terminal of the protruding region 19c faces forward along the axial direction, not radially outwardly as in the enlarging region 19ca, the protruding region 19c will go smoothly into the inlet region 33C without getting stuck with the inlet region 33C, and an inserting work of the protruding region 19c will be facilitated in comparison with an instance where the terminal is directed outwardly. Especially, the protruding region 19c of the airbag device M2 further includes the contracted region 19cc that is bent inward at the leading end of the circumferential wall 19cb, where the end plane of the protruding region 19c faces towards the inflator 12. This configuration will further facilitate the inserting work of the protruding region 19c.

As described above, in the head-protecting airbag device M2, the clamp 23C-1 is adequately prevented from being decoupled from the mounting bracket 17C by forming the protruding region 19c on the mounting bracket 17C, and therefore, only one clamp 23C will be sufficient to clamp the airbag 30C and inflator 12 against the mounting bracket 17C without a fear of decoupling. In other words, there is no need of another clamp for stopping decoupling of the airbag and inflator at the first fastened region 19a. Accordingly, mounting of the airbag 30C and inflator 12 on the mounting bracket 17C can be done with the two clamps (clamping members), i.e. with the first clamp 23C-1 which clamps the airbag 30C as well as the inflator 12 and the second clamp 23C-2 which clamps only the inflator 12 against the mounting bracket 17C.

However, the absence of the airbag 30C at the second fastened region 20a causes a difference between the first clamp 23C-1 and the second clamp 23C-2 in volume of the object of tightening, i.e. in condition for obtaining a predetermined tightening force in tightening work of the clamp. In the head-protecting device M2, in order to make an adjustment in volumes of the objects of tightening including the fastened regions and commonize the clamps, the length in the circumferential direction of the second fastened region 20a of the mounting bracket 17C is longer than the length in the circumferential direction of the first fastened region 19a. This will contribute to easy parts management and efficiency improvement in tightening works of the clamps.

Although the inflators in the foregoing embodiments have the gas discharge region at the front end, the invention can be applied to a head-protecting airbag device whose inflator has a gas discharge region at the rear end. Any clamping members which would be mounted around an object of tightening and tightened for producing a radially reducing tightening force may be employed as the clamping member of the invention.

What is claimed is:

1. A head-protecting airbag device comprising:
an airbag that is mountable on an upper periphery of a window of a vehicle inside the vehicle for deployment over the window, the airbag including a generally tubular inlet region for taking in an inflation gas;
an inflator that is connected with the inlet region of the airbag for feeding the airbag with the inflation gas, the inflator being generally cylindrical in shape and is provided with a gas discharge region for discharging the inflation gas;
a mounting bracket for holding and mounting the inflator on a vehicle body structure at the upper periphery of the window, the mounting bracket including a retaining region that holds the inflator and a bag-connecting region that is disposed at a region of the retaining region in a vicinity of the gas discharge region of the inflator and helps connect the inlet region of the airbag to the inflator, the bag-connecting region including:
a first fastened region that is in contact with an outer circumference of the inflator on an inner circumferential plane thereof and is wound by an annular first clamping member on an outer circumference thereof; and
a protruding region that is located farther towards a discharge direction of the inflation gas than the first fastened region and is formed partially in a circumferential direction of the inflator, the protruding region including a step plane that rises outwardly from the first fastened region,
wherein the airbag and the inflator are clamped together at the first fastened region of the mounting bracket by the first clamping member wound around the inlet region of the airbag with the protruding region and the first fastened region of the mounting bracket and a region of the inflator in a vicinity of the gas discharge region disposed inside the inlet region.

2. The head-protecting airbag device of claim 1, wherein the protruding region is formed at a leading end of the mounting bracket.

3. The head-protecting airbag device of claim 1, wherein the protruding region includes an enlarging region that is radially outwardly enlarged relative to the first fastened region and a circumferential wall region that extends further from the enlarging region along an axial direction of the inflator.

4. The head-protecting airbag device of claim 3, wherein the protruding region further includes a contracted region that is bent towards the inflator at a leading end of the circumferential wall.

5. The head-protecting airbag device of claim 1, wherein:
the mounting bracket further includes a second fastened region that is formed at an opposite side to the first fastened region in an axial direction of the retaining region; and
the second fastened region is clamped against the inflator by a second clamping member without the airbag disposed at an inner circumference of the second clamping member.

6. The head-protecting airbag device of claim 5, wherein:
a same clamping member can be used as the first clamping member and the second clamping member; and
a length in a circumferential direction of the second fastened region, at which only the inflator is clamped, is longer than a length in a circumferential direction of the first fastened region, at which the airbag and inflator are clamped.

7. The head-protecting airbag device of claim 1, wherein the inlet region of the airbag is provided, at a hem of an opening thereof, with a thickened region that is formed by doubling a cloth member forming the inlet region and integrating the doubled cloth member.

* * * * *